US011106792B2

(12) United States Patent
Kostyushko et al.

(10) Patent No.: US 11,106,792 B2
(45) Date of Patent: Aug. 31, 2021

(54) METHODS AND SYSTEMS FOR PERFORMING A DYNAMIC ANALYSIS OF APPLICATIONS FOR PROTECTING DEVICES FROM MALWARES

(71) Applicant: Acronis International GmbH, Schaffhausen (CH)

(72) Inventors: Alexey Kostyushko, Moscow (RU); Anastasia Pereberina, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 202 days.

(21) Appl. No.: 16/369,166

(22) Filed: Mar. 29, 2019

(65) Prior Publication Data

US 2020/0311268 A1    Oct. 1, 2020

(51) Int. Cl.
*G06F 21/00* (2013.01)
*G06F 21/56* (2013.01)
*G06F 21/52* (2013.01)
*G06F 21/57* (2013.01)

(52) U.S. Cl.
CPC ............ *G06F 21/566* (2013.01); *G06F 21/52* (2013.01); *G06F 21/561* (2013.01); *G06F 21/577* (2013.01)

(58) Field of Classification Search
CPC .......... G06F 21/566; G06F 2212/1052; G06F 21/52; G06F 12/023; G06F 12/1408; G06F 21/602; G06F 2212/402; G06F 21/577; G06F 21/56; G06F 21/561
See application file for complete search history.

(56) References Cited

U.S. PATENT DOCUMENTS

| 7,941,813 | B1 | 5/2011 | Protsaov |
| 8,756,696 | B1 | 6/2014 | Miller |
| 9,274,823 | B1 | 3/2016 | Koryakin |
| 10,482,239 | B1* | 11/2019 | Liu ..................... G06F 21/566 |
| 2002/0046275 | A1 | 4/2002 | Crosbie |
| 2007/0283192 | A1 | 12/2007 | Shevchenko |
| 2008/0222717 | A1 | 9/2008 | Rothstein |
| 2014/0283052 | A1* | 9/2014 | Jordan ................ H04L 63/1441 726/23 |

(Continued)

*Primary Examiner* — Ghazal B Shehni
(74) *Attorney, Agent, or Firm* — Arent Fox LLP; Michael Fainberg

(57) ABSTRACT

Disclosed herein are systems and method for deep dynamic analysis for protecting endpoint devices from malware. In one aspect, an exemplary method comprises launching a deep analysis process, by a deep analysis tool, the launching including: injecting a dynamically loaded component into an address space of an application code and initializing, by the dynamically loaded component, to allow an execution activity, by the injected dynamically loaded component, parsing dependencies of run-time linkages, hooking system functions, creating an application memory map with separate application and system code areas, transferring control back to the application code, and performing on-sample-execution activity, obtaining control of exception handler and monitoring attempts to use the exception handler, changing an available area, logging accesses, inspecting exception reasons and applying policies, determining whether or not the application of the sample is a malware, and sending a final verdict.

17 Claims, 14 Drawing Sheets

(56) References Cited

U.S. PATENT DOCUMENTS

| | | |
|---|---|---|
| 2015/0047032 A1 | 2/2015 | Hannis |
| 2017/0279842 A1 | 9/2017 | Jover |
| 2019/0347413 A1* | 11/2019 | Dubrovsky ............. G06F 21/53 |
| 2020/0137085 A1 | 4/2020 | Kostyushko |

* cited by examiner

METHODS AND SYSTEMS FOR PERFORMING A DYNAMIC ANALYSIS OF APPLICATIONS FOR PROTECTING DEVICES FROM MALWARES

CROSS-REFERENCE TO RELATED APPLICATIONS

The present disclosure is related to relates U.S. application Ser. No. 16/173,405, filed on Oct. 29, 2018, which is incorporated herein by reference.

FIELD OF TECHNOLOGY

The present disclosure relates to the field of data and endpoint device security, and, more specifically, to systems and methods for protecting devices from malwares by performing deep analysis on applications in a test environment—thereby providing data security.

BACKGROUND

At present, there is a growing need for providing data security. One way data gets compromised is when endpoint devices experience malware attacks. One approach to protect the data is to implement a malware detection software in the user device and update the software periodically. However, monitoring and analyzing activities on the user device requires a large amount of resources and causes performance degradation. Moreover, the depth of the analysis needs to be balanced with the need for non-interference with other software. For example, too much interference may cause other software on the device to fail or cause the user experience to be disrupted. When such software failures or degradations occur, often, the troubleshooting includes turning off firewalls and antivirus (anti-malware) software on the device. In addition, when an analysis is thorough, another antivirus software may consider the activities performed for the purpose of the analysis as "suspicious activities."

Traditional approaches for a thorough analysis include dynamic analysis tools that implement various techniques. The dynamic analysis consists consideration of: analysis implementation strategies for user space, kernel space, and emulator; analysis targets ranging from separate processes to entire systems and complete operating systems; types of analysis supported such as file, thread and registry operations; networking support such for simulated network services or internet access; cloaking support for hiding processes, modules of the analysis tool, modified memory pages, and for disguising elapsed time; clustering support; simulated user interaction support, etc. A cybersecurity service provider may need to perform deep analysis only in an environment where real data is not affected. Tools that modify the process under analysis may disguise these modifications by marking some pages as not present in physical memory and maintaining shadow copies to return to an analyzed process. The tools that modify the process often perform analysis in a safe isolated environment, e.g., an emulator, a hypervisor, or a real test server. The safe isolated environment enables the analysis to be performed without the need to protect user data of a real person. The malware may be detected after performing an unrecoverable action. Moreover, since all user actions in a safe isolated environment are emulated by a test server via scripts, they are intentional. In contrast, in a normal environment, an action may be due to a user request or due to an autonomous program behavior. In other words, the safe isolated environment provides an environment that allows for a controlled deep analysis. Analytical tools of the safe isolated environment may perform the analysis in a user-mode and a kernel-mode on real hardware test servers or in a virtualized environment (i.e., using virtual machines, containers and emulators). When the analytical tools of the safe isolated environment perform the analysis on real hardware test servers, the analytical tools may be inside the monitored system and require cloaking. In contrast, when the analytical tools perform the analysis in a virtualized environment, the analytical tool can be outside the monitored system, i.e., at the hypervisor, emulator side. In both cases, there is a need to hide performance degradations and carefully emulate normal system time flow. Regardless of the environment, the dynamic analysis tool may be discovered by the malware, and the dynamic analysis tool may not be able to keep control when the malware tries to copy part of the system library code and jump in the middle of a system function.

Therefore, there is a need to improve deep dynamic analysis techniques, while disguising the deep dynamic analysis tool from the malware and providing the data security in an efficient manner.

The present disclosure describes a method for improving the deep dynamic analysis of existing techniques and achieves a total control of the sample execution, for example, by splitting the memory into enabled and disabled areas.

SUMMARY

Aspects of the disclosure relate to the field of deep dynamic analysis of applications in accordance with a machine learning algorithm.

In one exemplary aspect, a method for deep dynamic analysis of applications is implemented in the endpoint device comprising a processor, the method comprising: launching a deep analysis process for determining whether a received sample of an application is a malware, the launching of the process including: injecting a dynamically loaded component into an address space of an application code and initializing, by the dynamically loaded component, to allow an execution activity, by the injected dynamically loaded component, parsing dependencies of run-time linkages, hooking system functions, creating an initial application memory map with separate application and system code areas, transferring control back to the application code, and performing an on-sample-execution activity, obtaining control of exception handler and monitoring attempts to use the exception handler, by the exception handler, changing an available area, logging accesses, inspecting exception reasons, and applying policies based on the exception reasons, analyzing data related to the logged access and determining whether the application of the sample is a malware, and sending, to the endpoint device, a final verdict indicating whether or not the application is a malware.

According to one aspect of the disclosure, a system is provided for deep dynamic analysis of applications, the system comprising at least one processor configured to: by a deep dynamic analysis tool of a server in a safe isolated environment, launch a deep analysis process for determining whether a received sample of an application is a malware, the launching of the process including: injecting a dynamically loaded component into an address space of an application code and initializing, by the dynamically loaded component, to allow an execution activity, by the injected dynamically loaded component, parse dependencies of runtime linkages, hook system functions, create an initial application memory map with separate application and system code areas, transfer control back to the application code, and perform an on-sample-execution activity, obtain control of exception handler and monitor attempts to use the exception handler, by the registered exception handler, change an available area, log accesses, inspect exception reasons, and apply policies based on the exception reasons, analyze data related to the logged access and determine whether the application of the sample is a malware, and send, to the endpoint device, a final verdict indicating whether or not the application is a malware.

In one exemplary aspect, a non-transitory computer-readable medium is provided storing a set of executable instructions thereon for deep dynamic analysis of applications, including instructions for, by a deep dynamic analysis tool of a server in a safe isolated environment, launching a deep analysis process for determining whether a received sample of an application is a malware, the launching of the process including: injecting a dynamically loaded component into an address space of an application code and initializing, by the dynamically loaded component, to allow an execution activity, by the injected dynamically loaded component, parsing dependencies of run-time linkages, hooking system functions, creating an initial application memory map with separate application and system code areas, transferring control back to the application code, and performing an on-sample-execution activity, obtaining control of exception handler and monitoring attempts to use the exception handler, changing an available area, logging accesses, inspecting exception reasons, and applying policies based on the exception reasons, analyzing data related to the logged access and determining whether the application of the sample is a malware, and sending, to the endpoint device, a final verdict indicating whether or not the application is a malware.

In one aspect, the injected dynamically loaded component makes a copy of the injected dynamically loaded component part that does not use anything besides pure system calls to an operating system kernel of the server and unloads itself.

In one aspect, during the on-sample-execution activity, the deep analysis tool disables the system code.

In one aspect, the execution activity is for interception of codes being transferred and patching of codes and data.

In one aspect, the application of the exception policies comprises: when the exception reason is an execution access, performing a memory access switch, when the exception reason is a write access, detecting a patch attempt and making a decision based on instruction disassembly, and when the exception reason is a read access, allowing a single reading.

In one aspect, a part of the injected dynamically loaded component used for the on-sample execution is transparent to the switching of the memory access.

In one aspect, the initialization includes applying a cloaking feature that returns original instructions for samples under analysis.

In one aspect, the deep analysis is performed while disguising time flow anomalies caused by the deep analysis tool.

It is noted that an endpoint device of U.S. patent application Ser. No. 16/173,405, filed on Oct. 29, 2018, that is protected from malwares is an endpoint device of the one or more endpoint devices to which the created suspicious patterns are distributed. An improved list of suspicious patterns is received by an endpoint device from the correlator. Thus, an improvement in the deep dynamic analysis performed in the safe isolated environment, improves the malware detection models of all of the endpoint devices receiving the suspicious patterns.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for deep dynamic malware analysis in a safe isolated environment for protecting endpoint devices from malware. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
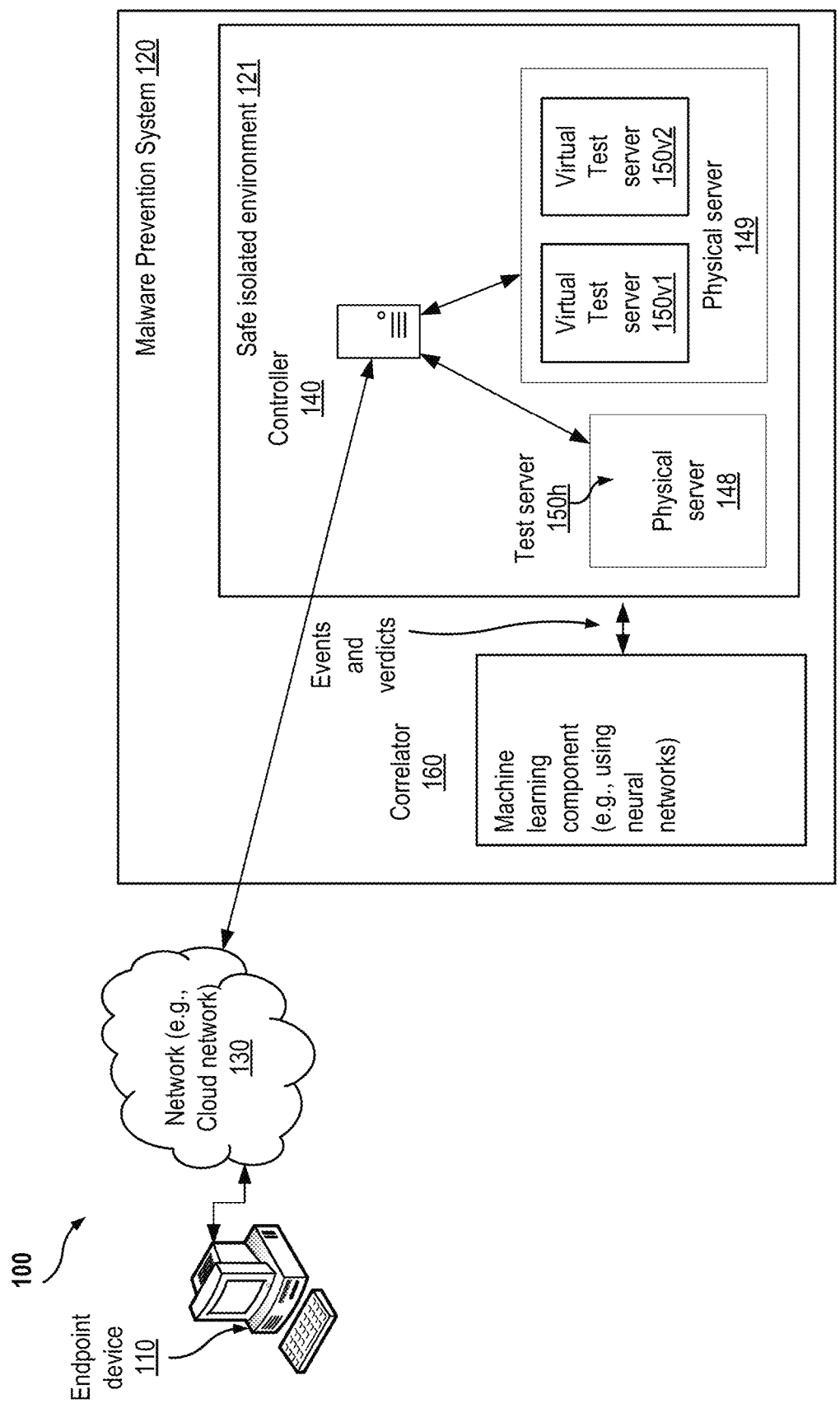
FIG. 1 is a block diagram illustrating an exemplary network for detecting malwares in accordance with aspects of the present disclosure.

FIG. 1 is a block diagram illustrating an exemplary network 100 for detecting malwares in accordance with aspects of the present disclosure. The network 100 comprises an endpoint device 110 communicating with a cloud-based malware prevention system 120 via a network 130, e.g., a cloud network or any other standard network used to enable endpoint devices to transmit and receive data.

In one aspect, the endpoint device 110 comprises an internet capable computer or hardware device on a TCP/IP network (desktop computer, laptop, smartphone etc.) intended for use by a logged user with user data of a real person to be protected from malware, or an internet capable computer device on a TCP/IP network (server) intended for providing services to remote users. In both cases, the endpoint device 110 contains valuable data and software that performs valuable workload.

Figure 7:
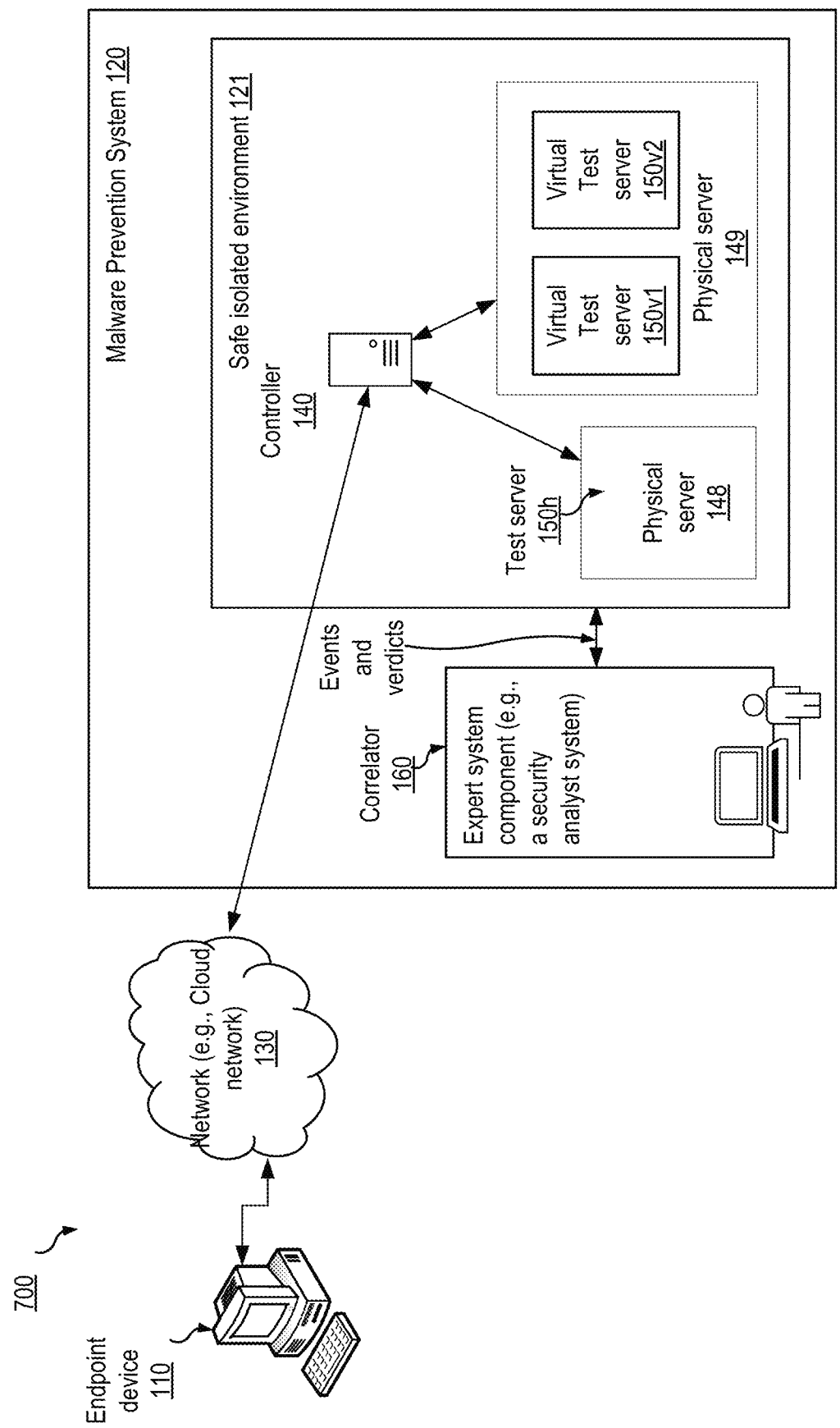
FIG. 7 is a block diagram illustrating an exemplary network for detecting malwares in accordance with aspects of the present disclosure.

The malware prevention system 120 includes: a safe isolated environment 121 and a correlator 160. The safe isolated environment 121 includes a controller 140 and one or more physical servers, e.g., physical servers 148 and 149. A hardware test server 150$h$ is implemented on the physical server 148. In other words, the functions of a test server are implemented on the physical server 148. The physical server 149 is being used in a virtualized environment. For example, virtual test servers 150$v$1 and 150$v$2 are instantiated on the physical server 149. As such, the test server functionality may be implemented via a hardware test server or a virtual test server. The correlator 160 is a component that correlates events detected by various malware detection tools. The correlator 160 may comprise a machine learning component (as shown in FIG. 1), or an expert system component (as shown in FIG. 7), or a combination of machine learning and expert system components. That is the learning component may be manual, semi-automatic, or fully automatic. However, in the case of machine only learning component, the system should have an interface for allowing a human to interact with the system. For example, false positives may be removed by a human, missed true-positives may be added by a human, etc. The expert system component may also be referred to as security analyst system. The machine learning of FIG. 1 may be facilitated using neural networks, which are one type of algorithms used for machine learning that model the data using graphs of artificial neurons (much like neurons of a brain). Moreover, a combination of algorithms may be used.

FIG. 7 is a block diagram illustrating an exemplary network 700 for detecting malwares by an endpoint device in accordance with aspects of the present disclosure. Note that FIG. 7 is similar to FIG. 1. For the scenario of FIG. 1, the learning module 160 operates to improve a detection model by training a neural network in an automated manner. For the scenario of FIG. 7, the learning module 160 operates by correlating events to create more heuristics, and feeding the created heuristics to the security analyst 160 via a human-machine interface. An event detected by a malware detection tool may be of "Type A" or "Type B." Type A event refers to an event that can be collected by an external monitoring tool. Some examples of Type A events are file operations, registry operations, thread creation, process creation, etc. Type A events are collected by both endpoint devices and test servers. However, collection of Type A events does not require invasive techniques. As such, the Type A events are collected without impacting the performance of the device while the collection is transparent to the software under monitoring. In other words, the code being monitored is unaware of the fact that Type A events are being detected. Type B event refers to an event detected inside a monitoring process using invasive techniques. The Type B events are detected via a deep dynamic analysis tool, e.g., by monitoring events on a test server of a safe isolated environment. Collecting Type B event is resource intensive and may lead to performance degradation. The correlation of event by the learning module 160 is to correlate events of Type A with events of Type B and use the results to create heuristics that are fed to the security analyst. The learning module 160 of FIG. 1 or FIG. 7 may be trained using the events of Type A, events of Type B, and the verdicts received from the safe isolated environment 121. For both scenarios, the events and verdicts are used by the correlator for improving detection methods.

In order to clearly illustrate the teachings, concepts and definitions used for descriptions of analysis tools used for malware detection are first provided.

In one aspect, malwares may be detected based on traditional antimalware techniques or next generation antimalware techniques. The traditional antimalware techniques are based on searches for malware signatures in databases. The databases are updated by security analysts. The update of the databases may be performed either directly or through a human-machine expert system that is powered by some tools and/or automation. Since the traditional approach is based on searches in databases, the detection technique is effective only for known threats. As such, unknown threats (e.g., zero day attacks) are undetectable via traditional antimalware techniques.

The next generation antimalware techniques are based on: execution of codes, behavioral analysis, and machine learning. Unlike the traditional antimalware techniques, the next generation antimalware techniques are suitable for detecting unknown threats. The next generation antimalware techniques may be used in conjunction with "honey pots". A "honey pot" refers to a storage (e.g., a database) used for placing objects of interest (e.g., user files, bitcoin wallets, credit card data, identity data, etc.). Malware attack vectors may then be activated such that access to the objects placed in the "honey pot" can be monitored. The behavioral analysis and machine learning are based on the monitoring of the events as the attack vectors interact with objects placed in the "honey pot." The precision of the detection algorithm is improved by gathering events triggered during the interaction with the honey pot and analyzing outcomes. For example, the probability of a false positive may be reduced.

In one aspect, the honey pot may be specifically designed to increase the chance of triggering an event. For example, a given honey pot may be designed to increase the chance of triggering an event related to identity theft.

In one aspect, the analysis for detection of malwares may be performed statically or dynamically. Static analysis refers to an analysis of software codes or binary executables without an execution. Dynamic analysis refers to an analysis that performs the execution of the software codes or binary. Therefore, the analysis tool for detecting the malwares may be a static analysis tool or a dynamic analysis tool.

A dynamic analysis tool may comprise a light dynamic analysis tool and/or a deep dynamic analysis tool. A light dynamic analysis tool is an analysis tool with low resource consumption, without invasive techniques that may interfere with software installed on a device, and with low performance impact on the device. The low resource consumption enables the light dynamic analysis tool to be implemented on an endpoint device.

A deep dynamic analysis tool is a malware detection tool with high resource consumption and may involve invasive techniques, e.g., hooking, patching, injection, and the like. For example, activities such as monitoring consume a lot of resources and use invasive techniques. Thus, it may be preferable to include such techniques only in the deep dynamic analysis tool. The deep dynamic analysis tool is designed to be launched in one or more computers of a testing environment, e.g., a computer in a laboratory setting, a computer in a data center that doesn't include real data. In other words, test computers can be infected with a malware without the risk of real data (user data of a real person) being leaked or lost. Unlike the light dynamic analysis tool, if a deep dynamic analysis tool is launched on an endpoint device, the user may experience degradation of performance, e.g., delays, software failures, etc.

The laboratory setting is also referred to as a "safe isolated environment" and includes a hardware and software system in a testing environment for isolating untrusted software, i.e., untrusted codes. In the present disclosure, the safe isolated environment is intended to be used for execution of suspicious samples (suspicious codes). The suspicious samples may eventually be identified either as malware or a clean code. The safe isolated environment includes a controller connected to a cloud based network transport mechanism. The hardware system of the safe isolated environment consists test servers intended for execution of suspicious samples in a pre-configured environment under control and with safety measures. In this scenario "safety" implies that, even in the case of the test server being infected by a malware during execution of the suspicious sample, the test server can be redeployed in a clean state via an automatic hardware reboot from the control infrastructure. Moreover, the redeployment occurs without spreading the infection. For example, the controller may include an internet/intranet filter for preventing or limiting the spread of malware. The test servers are deployed and redeployed in predefined configurations of typical desktop environments that are monitored by a deep dynamic analysis tool. As described above in conjunction with FIG. 1, the deep analysis tool may be deployed on a physical test server, e.g., test server 150$h$, or on a virtual test server that is instantiated on a physical server, e.g., virtual test server 150$v$1 or 150$v$2, which are instantiated on the physical server 149.

The cloud based network transport mechanism is used for sending the suspicious samples for execution in the safe isolated environment, receiving verdicts from the safe isolated environment, and updating malware detection modules in light and deep dynamic analysis tools. The cloud based network transport mechanism may be referred to as a "CloudBrain" and includes Application Programming Interfaces (APIs) for sending the samples and receiving the verdicts. Some components of the CloudBrain include Preboot Execution Environment (PXE) servers, backup/restore agents, development and operation (devop) systems and scripts, file servers, firewalls, etc.

Events of Types A and B may be gathered on demand, periodically, etc., based on the application. When events of the same type are received periodically, the number of events collected in a given time unit is referred to as a logging frequency. For example, the analysis of the deep dynamic analysis tool in the safe isolated environment may be run hourly to gather events of Type B. Then, the logging frequency for the Type B event may be provided as the number of Type B events per hour. Note that events of Type A are gathered on the endpoint devices as well as on the test server located in the safe isolated environment. In contrast, events of Type B are gathered only on the test servers located in the safe isolated environment.

Examples of events of Type A include at least one of: guaranteed events, logging or tracing events, and noninvasive monitoring events are described below.

Guaranteed events are events that are collected via subscription mechanisms in Operating Systems (OSs) that allow registering callback to receive notifications when an event occurs. The subscribers specifies or selects which type of events should be included in notifications. In general, receiving and processing guaranteed event leads to minimal additional workload for the subscribing endpoint device. Some examples of such work include link processing, thread creation, file and register access, and the like. Therefore, the resource consumption of such processes is generally not a concern.

Logging and tracing events include events of modern OSs with mechanisms for gathering and analyzing various statistics and logs by applications of the operating system. Enabling these mechanisms leads may have some performance impact and resource consumption, the impact being dependence on a frequency with which the events are gathered. For example, in Windows OSs, enabling the mechanism consists: enabling Windows Event Logs, Performance Counters, Event Tracing for Windows (ETW) logs, and Windows Management Instrumentation (WMI) Subsystems.

Noninvasive monitoring events are events collected by monitoring tools that can independently monitor processes and threads by: temporarily suspending application, resuming suspended applications, accessing memory associated with the suspended and resumed applications, and analyzing code and data flows of the processes and threads being monitored. Some techniques used by noninvasive monitors include stack trace analysis, detection of injections based on checking memory regions access rights to execute code, analysis of code and data flow based on modern Central Processing Unit (CPU) logging and tracing abilities, and the like. When compared to the guaranteed and the logging and tracing events, the noninvasive monitoring events create larger but acceptable workload and performance impact. When the analytical tools perform the analysis in a virtualized environment, the analytical tool is outside the monitored system, i.e., at the hypervisor. The tracing and monitoring may then include the monitored system and the virtualization environment.

In order to mitigate the increase in resource consumption at endpoint device and stay within acceptable levels, the present disclosure sets a frequency of event logging and a depth of the analysis for the noninvasive monitoring in accordance with a level of trust associated with the process or thread. Initially, a default logging frequency and a default depth of analysis is established. If the process is trusted (e.g., digitally signed by a trusted publisher), the frequency of event logging and the depth of analysis for process are adjusted lower. In contrast, if the process is untrusted, the frequency and depth of analysis are adjusted higher.

It is noted that the level of trust may change during execution. For example, an evidence of injection of an unknown code may be found during a stack trace analysis, an evidence of a code being patched in memory compared to an original disk image is revealed during data/memory integrity check, and so on. Then, the level of trust is lowered, the frequency of logging events is increased, and the depth of analysis is increased.

Examples of events of Type B include at least one of: events based on virtualization technologies, and events based on modification of system components are described below.

Events based on virtualization technologies are events gathered while the system (e.g., the system of a server in a safe isolated environment that is configured to imitate an endpoint device) is under control of a hypervisor that can provide additional events from the microprocessor. For example, the additional events may be gathered from one or more of: additional level of memory access control and protection, detection of execution of semi privileged instructions, additional cloaking abilities to hide analytical tools at root level inside hypervisor (outside of what is visible to OS and applications), and the like. This type of monitoring requires very careful emulation and leads to significant (30-50%) performance degradation. The user of the endpoint device typically does not want to convert the physical system into a virtual machine. Hence, such an environment is commonly considered invasive. However, if the endpoint device itself is a virtual machine, the user already selects a hypervisor vendor. But, a specific or custom hypervisor for the virtualization techniques may be needed.

Events based on modification of system components are events gathered in a testing environment, e.g., by replacing any desired system executable with a custom implementation. In one example, this may be accomplished using debug versions of vendor binaries. In another example, the replacement may be a full custom reimplementation of some APIs. Another approach is to use original binary components and patch a component's function in memory to transfer code flow execution to a "hook" in additional loaded library. In one aspect, missing callback capability may be incorporated to some of the APIs similar to the ones described above for the guaranteed and the logging and tracing events.

It is noted that the injection of dynamically loaded components, initialization and hooking require cloaking to hide changes from malware. For example, the malware may detect the loaded components and the hooking when performing code integrity check or an inter-module code transfer. Injection of dynamically loaded components and hooking are often counted as suspicious activities by antivirus software. Endpoint devices typically run antivirus software; hence injections of such components and hooking are not suitable for endpoint devices on which an antivirus software is running.

An import or import function refers to a function exported by dynamically loaded components to an application usage. An import address table contains addresses of import functions and is used to call these functions. The import address table is filled by the loader after mapping of the module in the process address space.

A system API refers to a function from the system dynamic libraries (e.g., for Windows APIs, well-known software development kits (SDKs), compiler run-times, etc.), Native API functions (e.g., for windows operating systems "ntdll.dll"), and system calls. In theory, static libraries inside applications (like openssl) can also be detected, but they can be separated only at page level, so some small portions of codes for static libraries inside applications may be counted as app.

Hook refers to a code used to implement a modified behavior. The term "hook" is used whenever, in a normal process, the term "callback" would be used. Just as callbacks can extend functionality in the normal process, hooks extend functionality for pre-processing and post-processing patched functions. It is desirable to implement the hook with a high-level language (such as C). Control switch (execution path) to hook usually occurs using a patch and a stub (described below). The hook may be implemented using a dynamically linked pointer to an external function (e.g., a function point patch (Import Address Table (IAT) patch for Windows), a function body patch, or even a system dynamically loaded component replacement with a custom system code. It is noted that modern operating systems allow replacement of dynamic libraries with their debug versions. To do the replacement, one may need a special test environment to overcome digital signature checks the operating systems demand to protect the system components. In order to resolve this issue, additional digital certificates or patches of OS kernel may be needed.

A patch refers to modified binary data that replaced an original code and to the process of modification. The aim of the modification is to switch control to the hook.

A stub refers to an assembly code to switch control to the hook code. The patch usually contains just jumps and stubs perform some low-level operations, e.g., saving registers, to fully conform with high-level language calling conventions or other requirements.

An injection (code injection) refers to a method of incorporating a component with hooks (usually a dynamically loaded component, e.g., for windows "Windows DLL", for Mac operating systems "DyLib", for Linus operating systems "Linux SO") into a target process.

A memory map refers to: a state of virtual memory of the process when the memory is split to a plurality of areas, with each area having a respective access right, and a structure for describing the state of the virtual memory.

An enabled part of a memory map refers to virtual memory pages that are not set as inaccessible by a present bit modification, or execute bit set to prevent execution.

A disabled part of a memory map refers to virtual memory pages that are set as inaccessible by a present bit modification to protect from malware patches. The code of the system library should also be protected with read-only bit.

Returning to the malware detection, the method of the present disclosure performs the malware detection by performing the light dynamic analysis on the endpoint device, both the deep dynamic analysis and the light dynamic analysis in the safe isolated environment, and the correlation in the correlator, the correlator including a machine learning component and/or an expert system component. The light dynamic analysis tool of the endpoint device generates monitoring events of type A and preliminary verdicts that indicate whether a behavior associated with a sample code is malicious, suspicious, or clean. If the verdict indicates that the behavior associated with the sample code is suspicious, the sample code is sent to a deep dynamic analysis tool of a safe isolated environment. Then, the deep dynamic analysis tool analyzes the sample code, generates events of type A and events of type B, and provides a final verdict as to the behavior of the sample code. The final verdict indicates whether the behavior associated with the sample code is malicious or clean. Then, the events of Type A, the events of Type B and the verdicts are provided to the correlator. For an illustrative example, the injected dynamically loaded component is the first code that is executed. Then, the dynamic analysis tool takes control on exception handling to ensure that page faults and other critical exceptions are processed first. Then, calls to system/library that can break or control of applications are intercepted. Memory maps of areas for applications are created and/or supported.

In one aspect, the correlator is configured to: automatically correlate the events of type A with events of type B, continuously learn from the correlation of the detected events, and provide improvements to the light and deep dynamic analysis tools—thereby enabling continuous improvement in malware detection. In other words, detection modules in the light and deep dynamic analysis tools are updated based on the correlation analysis between events of types A and B, by the correlator. As more event and verdict data is fed to the correlator by the various test servers in the safe isolated environment, the detection algorithm is improved. The correlator updates the databases of hashes, malware signatures, and patterns of events (e.g., events of Type A) that are likely to be indicative of a malware behavior. The updated databases are used by the endpoint devices and the servers in the safe isolated environment.

It is noted that the updates are not just for the endpoint device that had forwarded the sample for analysis in the safe isolated environment. Rather, the updates are distributed to all the servers in the safe isolated environment as well as to other endpoint devices. Thus, similar subsequent threats may be detected by static light analysis at the endpoint devices. The feedback from the correlator is vital for reducing a number of events needing a deep analysis in the safe isolated environment.

As more and more of the malwares and patterns having a malware behavior are detected at the endpoint devices, it is necessary to reduce the number of false positives as well as to dispense the samples appropriately. The method of the present disclosure includes a mechanism for handling the samples and processes of when such malwares or patterns are detected. First, when an endpoint device does not detect a malware but detects a suspicious pattern, a preliminary verdict is issued declaring the process as a "suspicious" process. Then, the process is temporarily suspended and the sample is sent to the safe isolated environment for deep analysis and a final verdict. When a final verdict received from the safe isolated environment indicates that the process is a malware, the process is terminated and the sample is quarantined. When the final verdict indicates that the process is clean, the process is allowed to resume, i.e., the suspension is lifted. The current approach for dispensing suspicious samples appropriately reduces the significant of a false positive at the endpoint; false positives create temporary suspensions and not terminations of processes. The methods of the endpoint device, the server in the safe isolated environment, and the correlator are described in conjunction with FIGS. 4-6.

Figure 2:
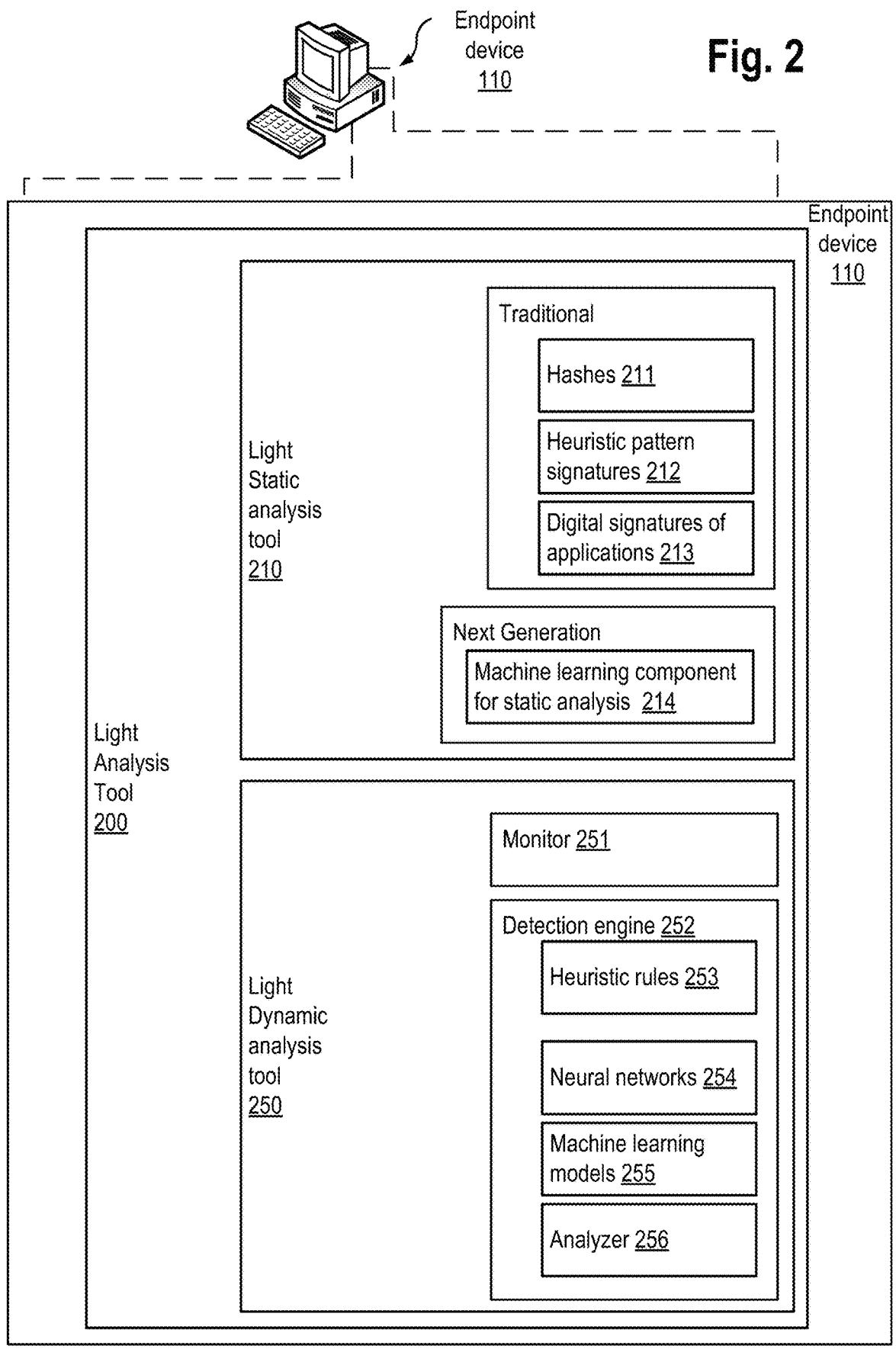
FIG. 2 is a block diagram illustrating an exemplary endpoint device for detecting malwares in accordance with aspects of the present disclosure.

FIG. 2 is a block diagram illustrating an exemplary endpoint device 110 for detecting malwares in accordance with aspects of the present disclosure. The endpoint device 110 comprises a cybersecurity product that includes a light analysis tool 200 for monitoring processes on the endpoint device and collecting Type A events. The light analysis tool may comprise a static light analysis tool 210 and/or a dynamic light analysis tool 250.

The static light analysis tool 210 detects malwares based on traditional or next generation detection models by checking the sample against known hashes and malware signatures. The traditional detection model is based on one or more of: hashes 211, heuristic pattern signatures 212, and digital signatures of applications 213. The next generation detection model is based of machine learning component 214 for static analysis, i.e., based on feedback received from a correlator.

For the next-generation approach, machine learning is used to continuously train the tool based on previous events and final verdicts, thereby reducing the amount of deep dynamic analysis to be performed. For example, when a new threat is discovered for one endpoint device using the method of the present disclosure, after the update is performed for one or more endpoint devices, subsequent threats to any of the one or more endpoint devices are discovered via the static analysis tool of the respective endpoint device, i.e., without requiring another deep dynamic analysis on a server of the safe isolated environment.

The dynamic light analysis tool 250 comprises a monitor 251 for events of Type A and a detection engine 252. The detection engine 252 includes one or more of: heuristic rules 253 received from a secure analyst, a neural network 254 (trained neural network), machine learning models 255, and an analyzer 256. The event monitor 251 gathers events of Type A in accordance with a selected logging frequency that depends on a level of trust. The level of trust for a process may depend on a presence of a digital signature of a trusted publisher, an evidence of external injections, an evidence of external plug-ins, and so on. In one example, the level of trust may be indicated in accordance with labels selected by the user of the endpoint device. For example, the labels may be "A+", "A", "A−" to indicate a level of trust. Then, based on the level of trust assigned to a process, a frequency and amount of monitoring the process may be adjusted.

Figure 3:
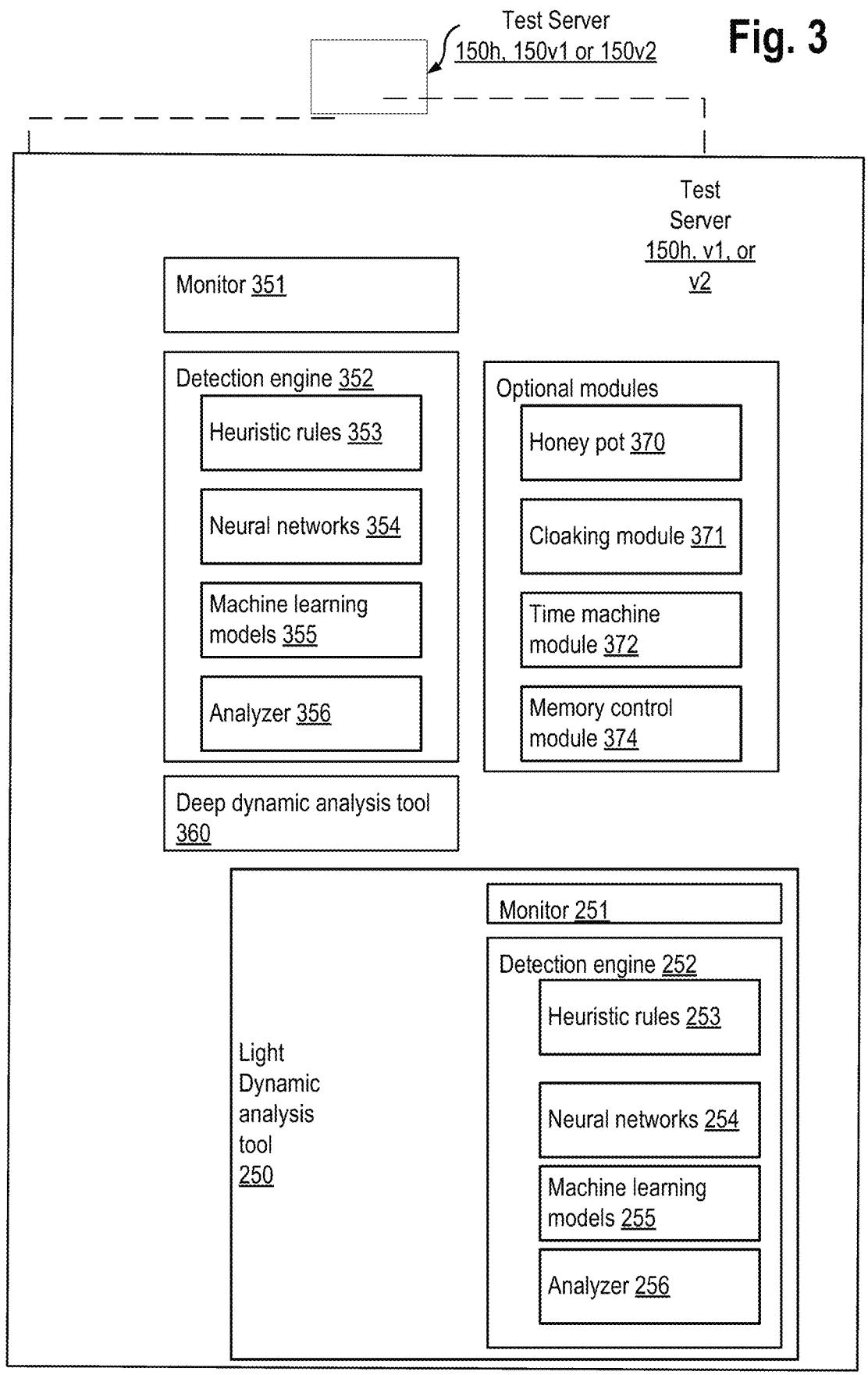
FIG. 3 is a block diagram illustrating an exemplary test server of a safe isolated environment used for detecting malwares in accordance with aspects of the present disclosure.

FIG. 3 is a block diagram illustrating an exemplary test server 150 of a safe isolated environment used for detecting malwares in accordance with aspects of the present disclosure.

The test server 150 comprises all the elements of the light dynamic analysis tool, i.e., the light dynamic analysis tool 250 described for the endpoint point device, as well as a deep dynamic analysis tool. Namely, test server 150 comprises a monitor 351 for monitoring events of Type A, a detection engine 352, a deep dynamic analysis tool 360. The deep dynamic analysis tool 360 may also be referred to as a toolchain. The deep dynamic analysis tool is used to collect events of Type B. The detection engine 352 includes one or more of: heuristic rules 353 received from a secure analyst, a neural network 354, machine learning models 355, and an analyzer 356. The analyzer 356 issues the final verdicts based on the analysis of the received events of Type B in accordance with applicable detection models.

In one aspect, the test server 150 may also include one or more optional modules such as: a honey pot 370, a cloaking module 371, a time machine module 372, and a memory control module 373.

In one aspect, the honey pot 370 is used to increase the chance of triggering a malware attack. Malwares may then be detected by monitoring when access to objects placed in the "honey pot" occurs. The deep dynamic analysis tool may then be able to determine how the attack vectors operate on data and/or files.

In one aspect, the cloaking module 371 is used for disguising the execution from the sample (sample code) under analysis. Artifacts of invasive techniques are hidden from the sample.

In one aspect, the time machine module 372 is used for managing time flow for the sample under analysis and to accelerate or slow down the time. In one example, an attack based on time (also referred to as a time bomb) may be revealed. In another example, a performance degradation that would result after an attack may be revealed by accelerating the time.

In one aspect, the memory control module 373 is used to control address space, maintain memory map, and manage access to memory pages associated with the memory map. The memory control module 373 controls the execution of the sample under analysis and monitors the execution to determine modifications due to the execution. When cloaking is implemented, the memory control module 373 also cloaks modifications made to the memory pages from the sample under analysis.

In one aspect, one or more of the optional modules 370-373 are included in the deep dynamic analysis tool. In another aspect, the optional modules 370-373 are included in the test server and the deep dynamic analysis tool employs the optional module as needed. In another aspect, the optional modules may be installed on another server with which the test server is communicatively coupled. In other words, the various elements used during the deep dynamic analysis may be installed on different or the same devices that are included as part of the safe isolated environment infrastructure.

The method of the present disclosure improves malware detection by a total control of application executions under the deep dynamic analysis tool 360. During the execution, the deep dynamic analysis tool 360 monitors the internal events of the application with invasive techniques. In one aspect, the invasive techniques comprise patches, hooks, and the like.

The deep dynamic analysis tool 360 of the present disclosure implements one or more of the following techniques:
- A first technique of the dynamic analysis tool is for memory access management. The first technique includes a mechanism for controlling an access switch from an application code to a system code and vice versa, and a mechanism for controlling dynamically generated code areas. For example, suspicious codes and system codes may be stored separately. The memory access management then controls the access to the separated system and suspicious codes. In addition, the dynamic analysis tool controls areas at which the dynamically generated codes are stored.
- A second technique of the dynamic analysis tool is for function call monitoring with logging of system API calls (e.g., operating system specific APIs, native APIs, system calls, etc.) and for collecting events of Type B.
- A third technique of the dynamic analysis tool is for implementing special hooks with arguments analysis, pre and post analysis targeted on monitoring, and cloaking of access control and analytical tools. In one aspect, the analytical tools include cloaking mechanisms implemented in the time machine module 372 and the memory control module 373.

The deep analysis tool 360 provides the analysis and malware detection for both single-threading applications and multi-threading applications. In one aspect, different approaches may be used for disguising the access control and analytical tools for single-threading and multi-threading applications.

In one aspect, the approach for disguising the access control may further depend on whether the various optional modules 370-373 are provided as part of the deep dynamic analysis tool 360 or separately.

As described above, the first technique of the dynamic analysis tool is for memory access management. The memory map of the present disclosure is split in two parts: a part for the system code, and a part for the application code. Parts of the memory map are disabled by marking pages as being "not present".

In one aspect, the memory access management comprises: for each time, enabling only one part of the memory map; making the system libraries unavailable when the application code is being executed; and making page faults to occur when the system code is calling, logging the system call associated with the page fault via an exception handler of the present disclosure, and switching the memory access. During the switching process, pages with application codes are marked as being "not present", while the system code is enabled. A symmetric mechanism performs the switching back to the application code.

It is noted that page fault generation can lead to performance degradation of the system. In order to mitigate the impact on the performance, the memory switcher may be directly called from hooked API. Alternatively, the performance improvement and cloaking may be provided using a TLB cache split. However, some of the mitigation methods may demand kernel components of the deep dynamic analyzer.

Figure 4:
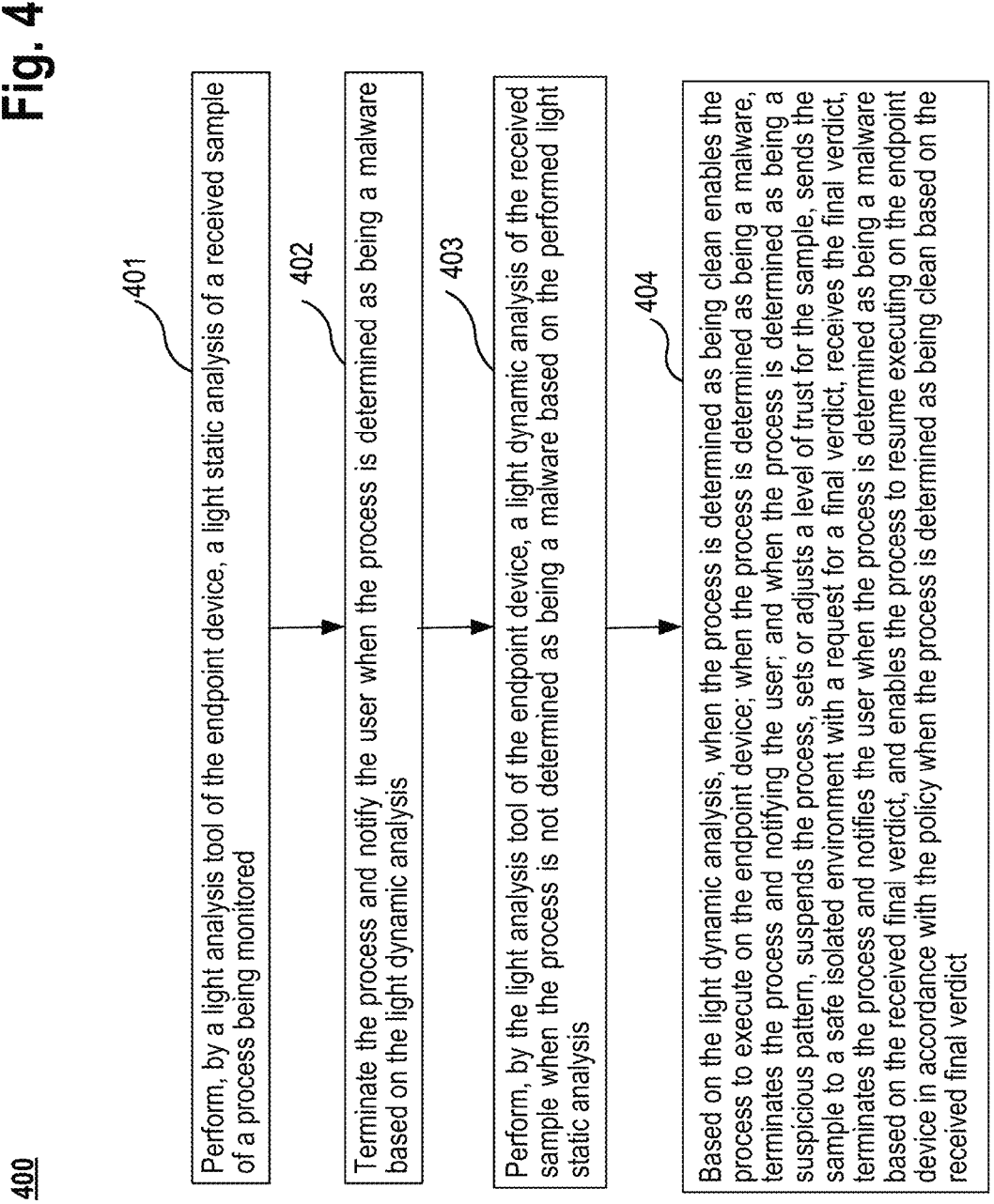
FIG. 4 illustrates a flow diagram of a method for detecting malwares by an endpoint device.

FIG. 4 illustrates a flow diagram of a method 400 for detecting malwares by an endpoint device. In step 401, the method performs, by a light analysis tool of the endpoint device, a light static analysis of a received sample of a process being monitored. In step 402, the method terminates the process and notifies the user when the process is determined as being a malware based on the light dynamic analysis. In step 403, the method performs, by the light analysis tool of the endpoint device, a light dynamic analysis of the received sample when the process is not determined as being a malware based on the performed light static analysis. In step 404, when the process is determined as being clean based on the light dynamic analysis, the method enables the process to execute on the endpoint device in accordance with a policy; when the process is determined as being a malware based on the light dynamic analysis the method terminates the process and notifying the user; and when the process is determined as being a suspicious pattern based on the light dynamic analysis, the method suspends the process, sets or adjusts a level of trust for the sample, sends the sample to a safe isolated environment with a request for a final verdict, receives the final verdict, terminates the process and notifies the user when the process is determined as being a malware based on the received final verdict, and enables the process to resume executing on the endpoint device in accordance with the policy when the process is determined as being clean based on the received final verdict.

As described above, the endpoint device sends the sample to the safe isolated environment with a request for a final verdict. In turn, a controller 140 of the safe isolated environment receives the sample from the endpoint device through the cloud network 130. The controller 140 selects and deploys a test server of any number of test servers of the safe isolated environment to imitate the endpoint device, i.e., the user environment. The test server is the server in the safe isolated environment specifically setup to imitate the endpoint device. Once the server of the safe isolated environment is deployed imitating the user environment, the sample is loaded and launched on the deployed server in accordance with the analysis tools of the server, which include the deep dynamic analysis tool 360.

Figure 5:
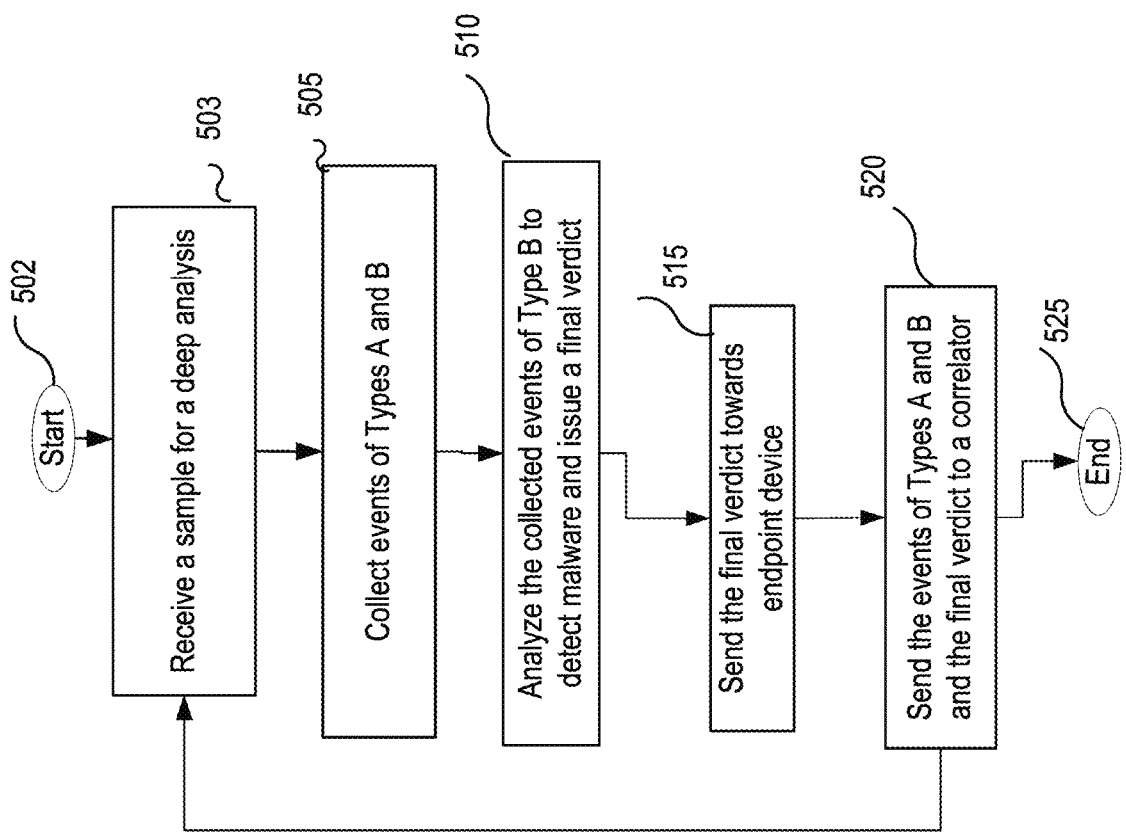
FIG. 5 is a flow diagram of a method for detecting malwares by a server of a safe isolated environment (test server) in accordance with aspects of the present disclosure.

FIG. 5 is a flow diagram of a method 500 for detecting malwares by a server of a safe isolated environment (test server) in accordance with aspects of the present disclosure. Method 500 starts in step 502 and proceeds to step 503. In step 503, method 500 receives a sample for a deep dynamic analysis, the sample being of a process being monitored. In step 505, method 500 of the test server (server of the safe isolated environment) collects events of Type A and B, the events of Type B being collected via the deep dynamic analysis tool 360. In step 510, method 500 analyzes, by a detection engine of the test server, the collected events of Type B using one or more detection models of the deep dynamic analysis tool 360 to detect malwares and issue a final verdict indicative of whether the process is a malware or clean. In step 515, method 500 sends the final verdict to the controller of the safe isolated environment for forwarding to the endpoint device. Accordingly, the controller receives the final verdict from the test server and forwards to the endpoint device via the cloud network. The endpoint device receives the final verdict, as described in step 404. In step 520, method 500 sends the collected events of Types A and B, and the final verdict to a correlator. The method proceeds either to step 525 to end the process or to step 503 to continue processing other samples.

Figure 6:
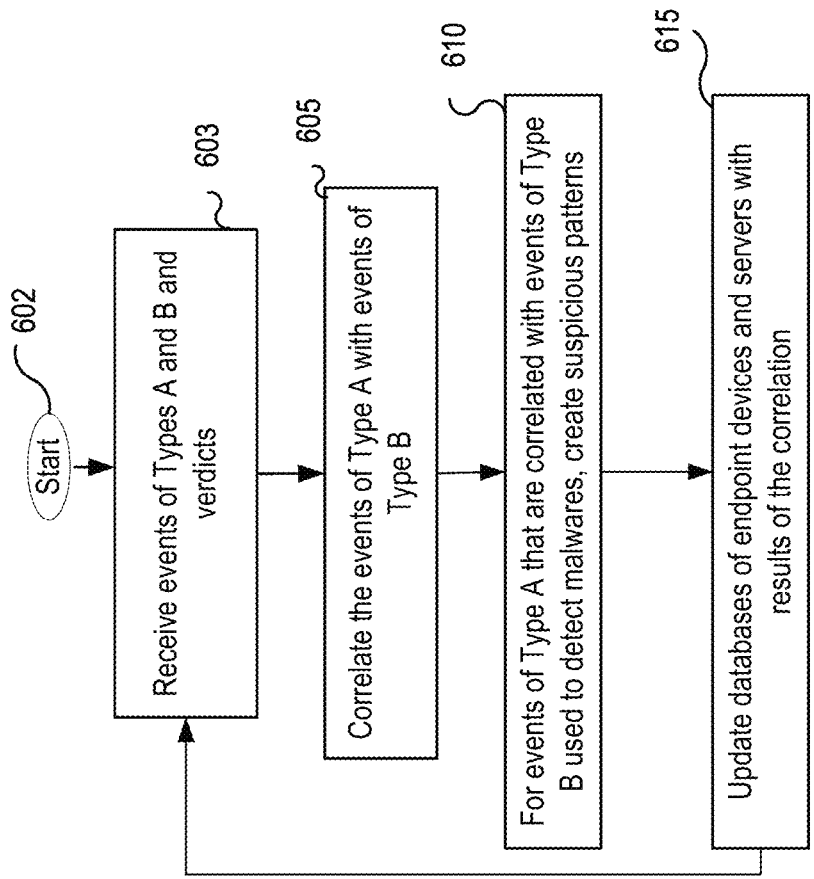
FIG. 6 is a flow diagram of a method for correlating, by a correlator, events detected by endpoint devices and servers and for updating detection modules in accordance with aspects of the present disclosure.

FIG. 6 is a flow diagram of a method 600 for correlating, by a correlator, events detected by endpoint devices and servers and for updating detection modules in accordance with aspects of the present disclosure. Method 600 starts in step 602 and proceeds to step 603. In step 603, method 600 receives events of Type A, events of Type B, and verdicts. The events of Type A, events of Type B and the verdicts are received from one or more servers. In step 605, method 600 correlates the events of Type A with the events of Type B. The method determines which of the received events of Type A are correlated with events of Type B that are used to detect a malware. In step 610, for events of Type A that are correlated with events of Type B used to detect a malware, method 600 creates suspicious patterns. In step 615, method 600 updates databases of endpoint devices and servers with results of the correlation. For example, detection models in various endpoint devices are updated to include the newly created suspicious patterns. The method then proceeds to step 603 to continue receiving other events and verdicts.

As described above, all of the endpoint devices using the services of the correlator receive the suspicious patterns and therefore benefit from the distribution of the newly created suspicious patterns. In addition, databases used by servers in the safe isolated environment are updated. Accordingly, the correlator of the present disclosure enables a feedback mechanism for training the models within the endpoint devices. Subsequent threats from similar processes are detected by the light dynamic analysis tools in the endpoint devices.

Figure 8:
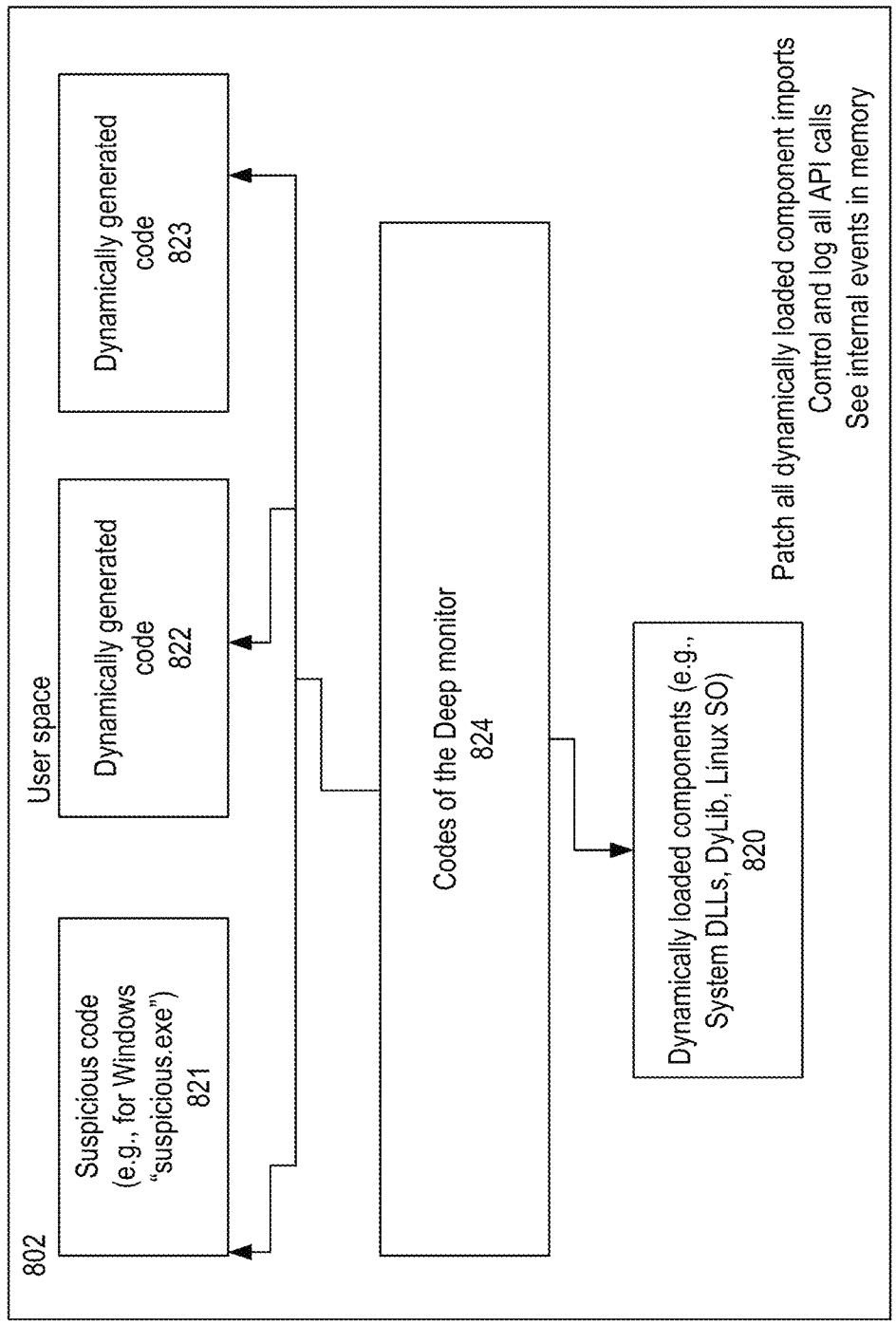
FIG. 8 illustrates a memory of the present disclosure with separated spaces for system and application codes.
Figure 9A:
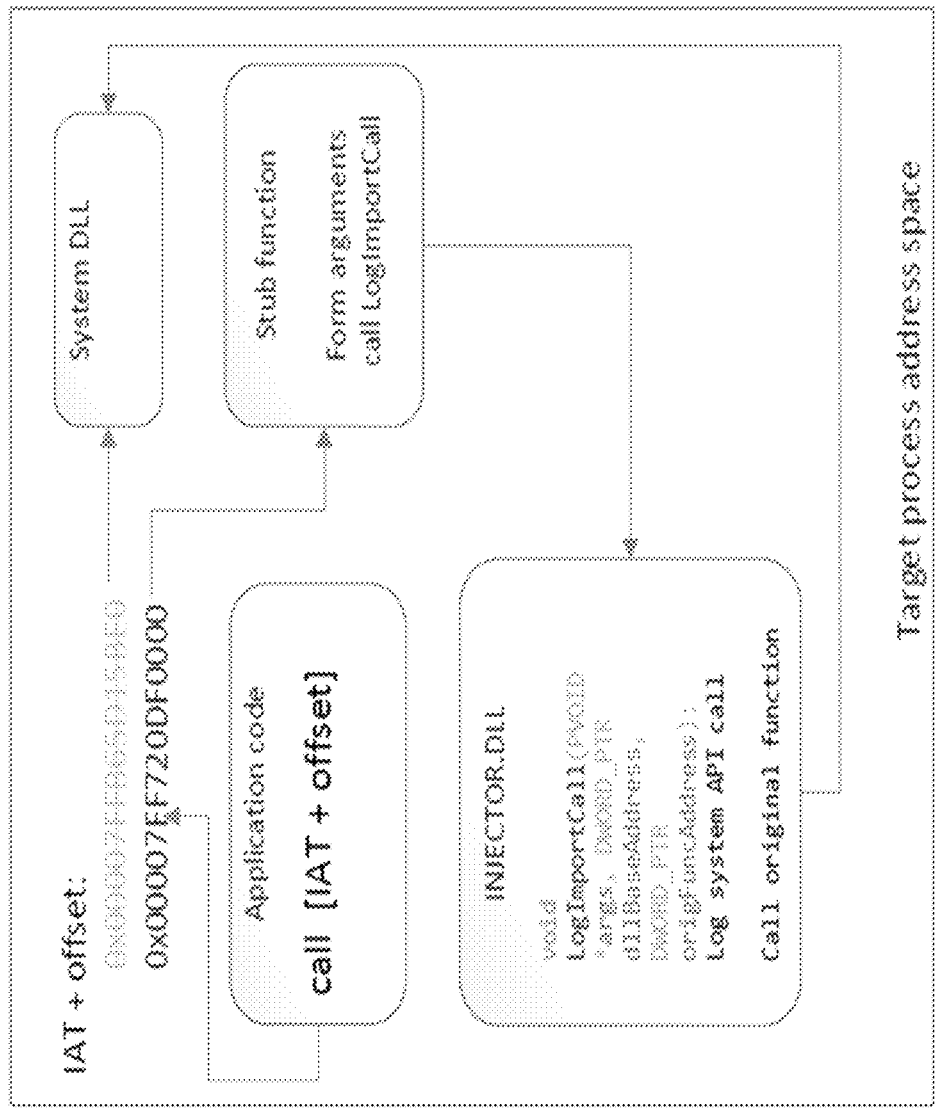
FIG. 9a illustrates an exemplary dynamically linked pointer to an external function of the present disclosure used for Windows based systems to patch the dynamically loaded component imports.
Figure 9B:
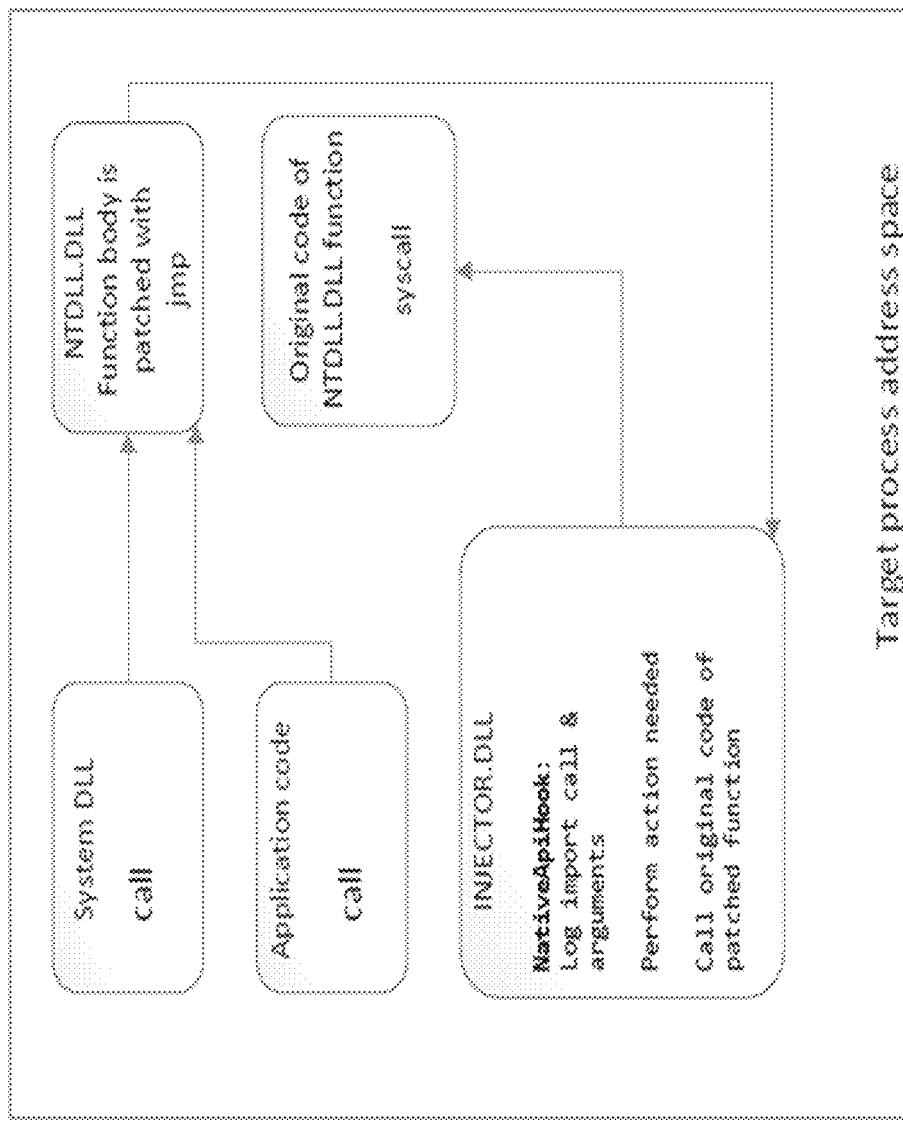
FIG. 9b illustrates an exemplary function body patch of the present disclosure used for Windows based systems to patch the dynamically loaded component imports.

FIG. 8 illustrates a memory 800 of the present disclosure with separated spaces for system and application codes. The memory 800 comprises a kernel space 801 for storing kernel components, and a user space 802 for storing user components. The user space 802 may be used for storing system codes 820 (e.g., system dynamically loaded components), suspicious executable codes 821, dynamically generated codes 822 and 823, and codes of the monitor 824 (e.g., codes of the deep analysis tool 360). The deep analysis tool 360 may be used to patch all dynamically loaded component imports, and to monitor and control function calls, e.g., by logging of system API calls and collecting internal events, e.g., events of Type B. FIG. 9a illustrates an exemplary dynamically linked pointer to an external function of the present disclosure used for Windows based systems to patch the dynamically loaded component imports. For instance, in the case of Windows operating systems, the dynamically linked pointer to an external function may be an IAT patch and an offset. FIG. 9b illustrates an exemplary function body patch of the present disclosure used for Windows based systems to patch the dynamically loaded component imports. For other systems, e.g., for Linux and Mac systems, the address space would be similar but would have other names.

As described above, the deep analysis tool 360 may be used for both single-threading applications and multi-threading applications. In one aspect, the system code and application code may be separated into two thread pools, one thread pool for executing the system code and the other thread for executing the application code.

Then, the separation of the execution for system and application codes may be accomplished in one of two approaches: the first approach is by separating the executions by address space and the second approach is by separating the executions by time quanta. At each moment, only one code class (i.e., system or application, but not both) is allowed to execute. When one pool is executing, the other pool is disabled.

In one aspect, the separation of the executions by address space is performed when an application splits into two processes. The first process disables the system code and makes the system code unavailable for execution. The second process disables the application code. Instead of the memory access switching described above, the switching is performed to a twin-thread execution. For instance, when a thread in the first process calls the system code, the deep analysis tool suspends the thread of the first process, placing it into a waiting state, and transfers the state and arguments to the second process for the twin-thread execution.

In one aspect, to illustrate, for Windows based systems. the twin-threads (i.e., twin processes) are created as follows. First, PEB, TEB, system handles, system structures and VAD both in the initialization time and runtime, are duplicated. The structures needed are SHARED_USER_DATA, LDR_LIST, TLS. To prevent system code calling using systenter, PICO/Minimal process technology implemented to support Linux-process on Windows may be used. Note that care needs to be taken to make sure that process under analysis does not find out method artifacts. Special hooks could be used to make switch invisible. The switch disguise also demands stack protection. To mitigate impact on performance caused by page translation cache reset Intel VCID or PCID mechanisms may be used. Page translations are identical in twin processes and the same context ID can be used. Then, bad pages are reset.

Figure 10:
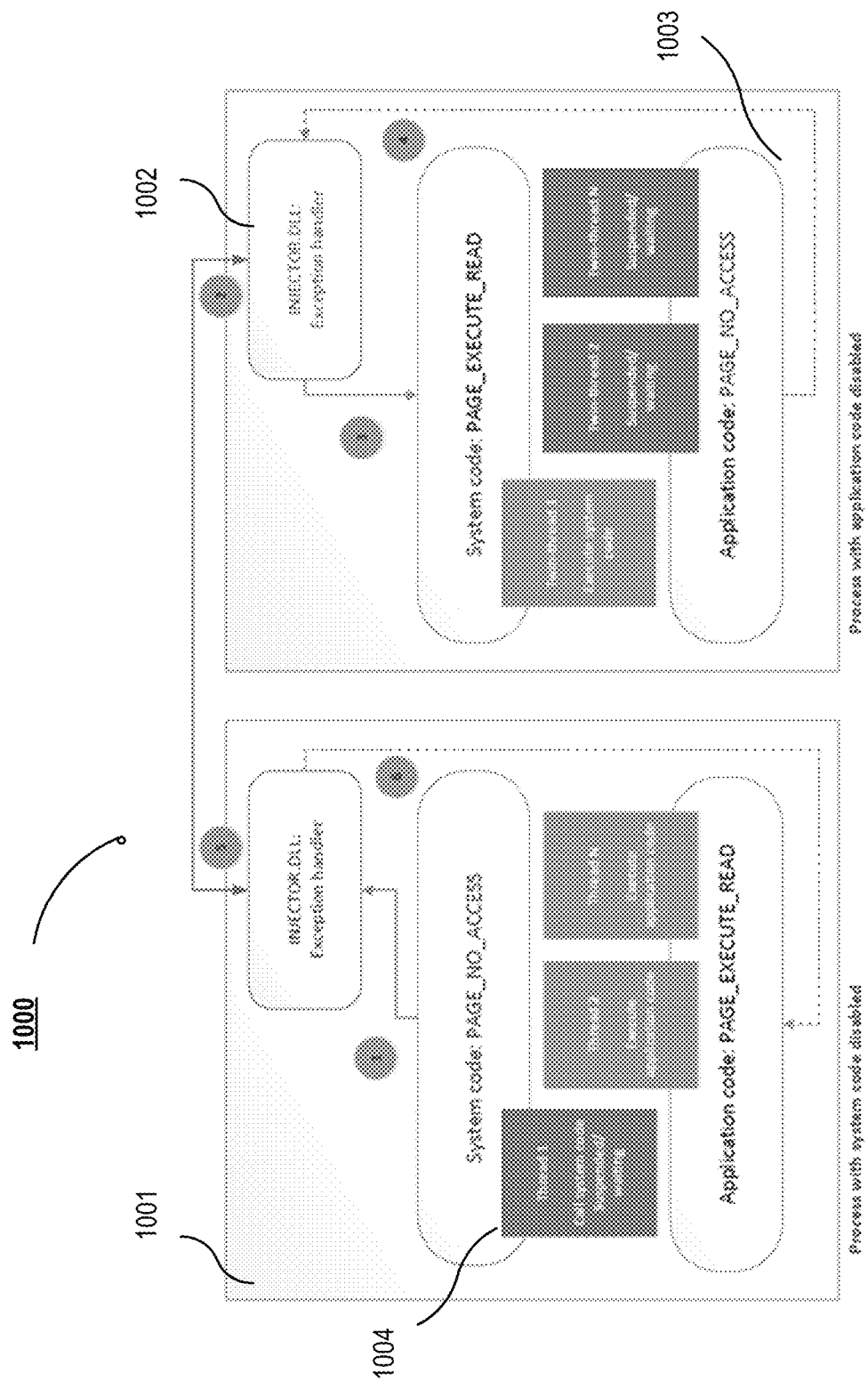
FIG. 10 illustrates an exemplary switching between two threads of execution on a Windows based system, one thread being for system codes and one thread being for application codes in accordance with aspects of the present disclosure.

FIG. 10 illustrates an exemplary switching between two threads of execution on a Windows based system, one thread, thread 1001, being for system codes and one thread, thread 1002, being for application codes in accordance with aspects of the present disclosure. For the Windows based example, when the thread for the application code 1002 is executing, the system code is disabled and returns "PAGE_NO_ACCESS", as shown in 1003. Similarly, when the system code 1001 is executing, the application code is disabled and returns "PAGE_NO_ACCESS", as shown in 1004.

In one aspect, the separation of the executions by time quanta is performed by implementing a user-mode scheduler inside the process under analysis. The user-mode scheduler is aware of two code classes and allows execution of threads for the code (either the system or the application, but not both) that is executing from enabled memory areas. The user-mode scheduler is also tasked with ensuring that both pools get time quants. When a page fault occurs, the thread in other pool is transferred and suspended or put in a waiting state. In addition, the user-mode scheduler may decide whether the executed pool is to be switched.

In one aspect, the memory access management is performed while disguising separation artifacts and supplicating memory descriptor structure used by operating system memory manager. Each operating system has structures that describe user-pace virtual memory layout. For Windows, it is referred to as Virtual Address Descriptors (VADs) and for Linux it is referred to as mm_struct. Thus, for multi-threading applications on a Windows based system, the threads share the VAD. That is, the twin threads share all their memory. Therefore, if one process allocates memory, the other process must do the same.

Figure 11:
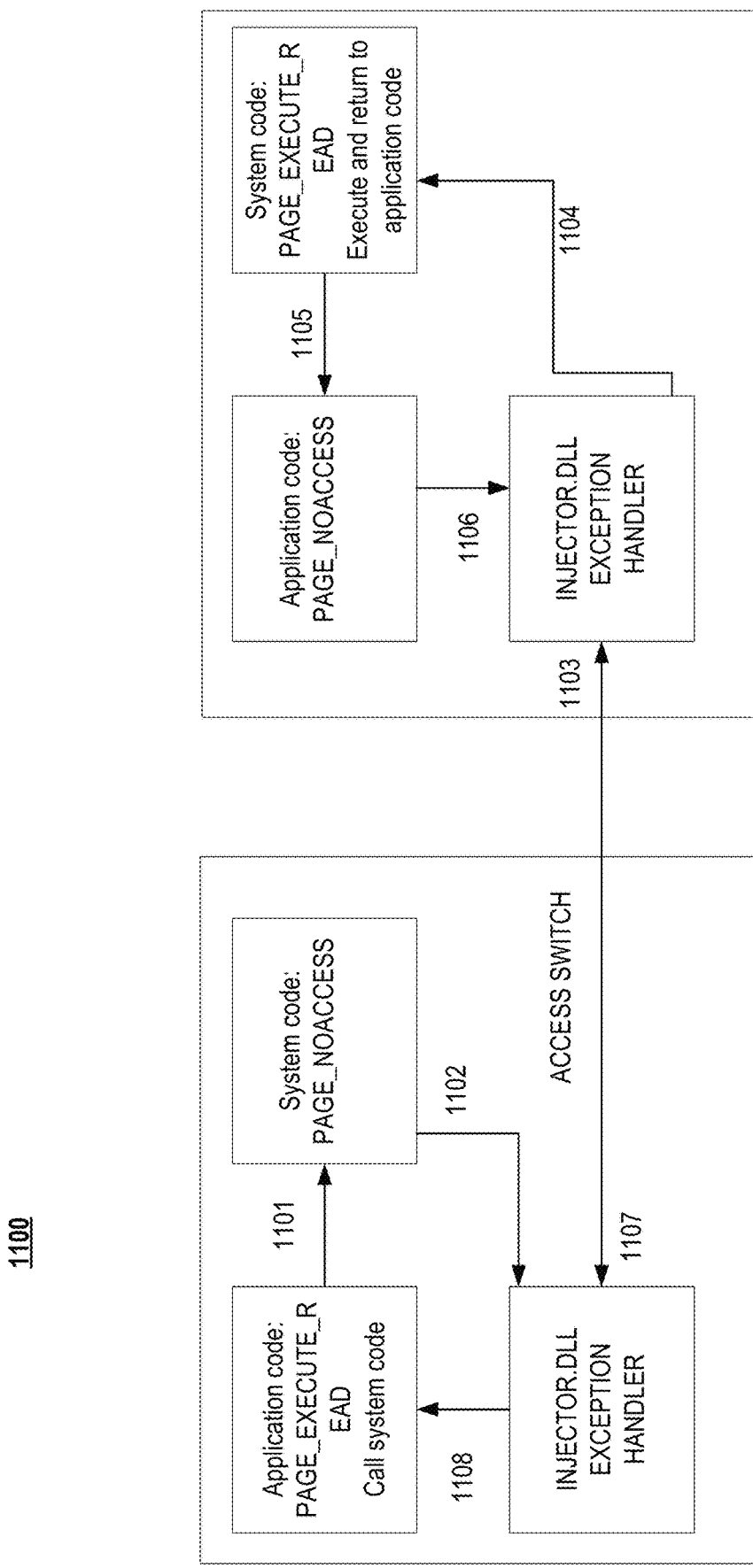
FIG. 11 illustrates an exemplary access switch for memory access management on a Windows based system in accordance with aspects of the present disclosure.

FIG. 11 illustrates an exemplary access switch 1100 for memory access management on a Windows based system in accordance with aspects of the present disclosure. For the example of the Windows based system, when an application code is executed, the system code pages are marked as not present in physical memory. As shown in 1101, control flow is transferred to the system code. When the control flow is transferred to the system code, an EXCEPTION_ACCESS_VIOLATION occurs. Then, as shown in 1102, a registered exception handler is called. As shown in 1103, the exception handler inspects the exception reason (in this case, DEP_VIOLATION) and makes an access switch. For this scenario, the application code pages are not presented, while the system code is available. As shown in 1104, the execution is transferred to system code that can call other system codes. As shown in 1105, the execution is returned to the application code. As shown in 1106, an exception with execution reason occurs. In 1107, when the exception with the execution reason occurs, the access is switched back. As shown in 1108, the control flow transfers back to application code execution. Read and write accesses are processed independently. Note that, for the example of FIG. 11, in order to prevent infinite recursion, system dynamically loaded component is not used in exception handler code. In addition, in order to make the injector.dll transparent during the switch process, the system dynamically loaded component is not used in the universal logger. At the POC (proof of concept) stage, system libraries could be disables except for kernel32.dll, kernelbase.dll and ntdll.dll. To get rid of kernel32.dll and kernelbase.dll functions, Native API function may be called directly and minimal C RunTime support may be implemented. To minimize ntdll.dll usage, system code may be called using sysenter, but the ntdll.dll cannot be totally disabled because it implements exception handling. However, pages that are not connected with exception handling can be disabled. The kernel component is then needed to get rid of ntdll.dll.

When a malware attempts to copy a part of a system library code and jump in the middle of a system function, the memory access management of the present disclosure enables deep analysis tool to remain in control of the process. In addition, the deep analysis tool detects when the application gains control of the flow by a callback from the system function, e.g., for Windows based systems, an EnumFonts or CreateThread is detected.

As described above, the function call monitoring is performed with logging of system API calls. In one aspect, the function call monitoring is performed using a system API hook technique with a dynamically loaded component injection. As described above, the dynamically loaded component injection is intended for influencing the behavior of a target program. For example, the influence may be accomplished by running a code within an address space of a process of the target program and forcing the process of the target program to load a dynamically loaded component. For example, the injected code may be for hooking system function calls.

In one aspect, the system API hook technique is performed using: an Import Address Table (IAT) patch or a function body patch, and replacing the system dynamically loaded component. FIG. 9a illustrates a dynamically linked pointer to an external function of the present disclosure. For example, for Windows OS the dynamically linked pointer to an external function may comprise an IAT patch. FIG. 9b illustrates a function body patch of the present disclosure.

A universal hook is used for monitoring, while special hooks are used for providing additional controls. For example, on Windows based systems, an "NtQueryMemory" hook may be used to disguise injected code areas, "NtAllocateVirtualMemory" and "NtVirtualProtect" hooks may be used to track a dynamically added code, an "NtWriteProcessMemory" hook may be used to detect injection in other processes attempt system API to create process hook, etc.

When the sample is received for an application under analysis, the deep analysis process is launched. The launching of the process includes: injecting the dynamically loaded component into the address space of the application code (e.g., codes of the deep monitor 824), and initializing, by the dynamically loaded component, to allow an execution activity. The initialization is performed to allow the injected dynamically loaded component to perform the execution activity.

To illustrate, the injection of the dynamically loaded component on a Windows based system is performed using CreateRemoteThread and LoadLibrary. The address, e.g., kernel32.dll address, is obtained from an LDR pointer in Process Environment Block (PEB) that is filled during a user-mode initialization and is NULL when the process is created in a suspended state. In order to get the PEB.LDR, the execution is started. Therefore, the entry point is patched with continuous jump and the process is started.

In turn, the injected dynamically loaded component performs the following activities: (i) the injected dynamically loaded component parses dependencies of run-time linkages. For example, the dynamically loaded component may parse dependencies on run-time linkages; (ii) hooks the system functions.

For example, for Windows based system, the hooking of the system function may be performed using patch IATs or special hooks. The special hooks are used by system code modifications with argument analysis, pre- and post-analysis, or behavior modifications. When the patch IATs are used, import function addresses are replaced by addresses of auto-generated stubs that transfer control to a universal logger function. The universal logger function logs the system call and transfers execution to the original function. The functionalities to be hooked to keep control under sample execution include functionalities for: controlling VAD for executed pages, controlling memory access switch, and handling multi-threaded applications and applications that create other processes. In one example, the functionalities for controlling of the VAD for executed pages comprise any number of Low-level APIs and High-level APIs. The Low-level APIs include one of more of: NtWueryVirtualMemory hook to disguise injected code areas, NtAllocateVirtualMemory and NtProtectVirtualMemory with PAGE_EXECUTE hook to detect dynamically generated code areas, and the like.

The High-level APIs for the Windows based system include one or more of: CreateHeep, malloc, VirtualProtect hook, and the like. The functionalities for controlling the memory access switch include one or more of:

hook VEH functions (Add VectoredExceptionHandler, Add VectoredContinueHandler),

SEH functions (RtlAddFunctionTable, RtlInstallFunctionTableCallback, SetUnhandledExceptionFilter, RtlCaptureContext), Debug API (DebugActiveProcess, SetThreadContext, Wow64SetThreadContext), and the like.

There are numerous APIs malware could use to perform their tasks. For the purposes of this disclosure, the categories of APIs for interception are defined as being the following:

Memory Management: VirtualAlloc, VirtualProtect, CopyMemory, MoveMemory, HeapAlloc, etc.

Windows Registry Modification: RegReplaceKey, RegSetValueEx, RegSaveKey, etc.

Process and Thread Handling: CreateProcess, GetCurrentProcess, CreateThread, etc.

File Management: CreateFile, GetTempPath, ReplaceFile, etc.

External Communication: connect, receive, send, TransmitFile, TransmitPackets, etc.

Dynamic-Link Library Manipulation: LoadLibrary, GetProcAddress, GetModuleFileName, etc.

The functionalities for handling multi-threaded applications and applications that create other processes include one or more of: hook NtSuspend/ResumeProcess/Thread, NtQuery/SetInformationProcess/Thread, NtCreateThread/Process, and the like.

In addition to the functionalities, described above, needed for: controlling memory descriptor structure for executed pages, controlling memory access switch, and handling multi-threaded applications and applications that create other processes, other APIs that provide further control may be loaded. For example, NtWriteProcessMemory hook may be added to detect injection into other processes, CryptoAPI hook may be added to detect encryption, etc.

Then, the injected dynamically loaded component (the code of the deep monitor) creates an initial application memory map with separate application and system code areas. In one aspect, the injected dynamically loaded component optionally makes a copy of the injected dynamically loaded component part that does not use anything besides pure system calls to the OS kernel and unloads itself—thereby cleaning any evidence that the injected dynamically loaded component was ever loaded. The injected dynamically loaded component includes two parts. The first part is executed in an initialization phase when the process being examined has not been started or is suspended. The second part does not use anything besides pure system calls to the OS kernel. Therefore, the second part can be copied. Thus, the copy described herein is only for the second part. However, the second part may also include some templates that will be additionally configured as dynamically generated codes based on an initial analysis, for example, to adjust values of pointers to the code due to ASLDR. The ability to copy the second part allows the injected dynamically loaded component to unload and hide any evidence that the injected component was ever loaded. In other words, this feature provides a cloaking technique.

Then, control is transferred back to the application code. The transferring back of the control to the original application code enables the injected dynamically loaded component to perform an on-sample-execution activity.

In one aspect, during the on-sample-execution activity, the deep analysis tool disables the system code—thereby marking the memory pages associated with the system code as "not present". For example, for Windows systems, the disabling of the system code may be accomplished using PAGE_NO_ACCESS or via other improved methods.

The method then obtains control of exception handler and cloaks from self-debugging and code integrity checks.

The registered exception handler changes the available area and logs the access. The exception handler also inspects the exception reason and applies different policies based on the reason. For an execution access, the exception handler performs memory access switch. For a write access, the exception handler detects the patch attempt and makes a decision based on instruction disassembly. For example, for a read access on a Windows based system, the exception handler applies the following mechanisms to allow a single reading:

The EXCEPTION_ACCESS_VIOLATION handler enables access to the target area and sets trap flag in EFLAGS. EXCEPTION_SINGLE_STEP handler disables target area access.

The EXCEPTION_ACCESS_VIOLATION handler enables access to the target area and replaces the next instruction with INT 3. The EXCEPTION_BREAKPOINT handler disables target area access.

The deep analysis tool then analyzes the logged access and determines whether the sample is malicious or clean.

For the scenarios in which the application either loads additional dynamically loaded components (either system or the application itself) or dynamically generates codes, the hooks of the memory control module update the memory map.

In one aspect, for the scenarios in which the application loads additional dynamically loaded components or dynamically generates codes, the hooks continue the cloaking such that the application is disallowed from finding the patches (e.g., via code integrity check) and from finding Virtual Address Descriptors (VADs) used by the deep analysis tool.

In one aspect, the memory control module may further find well-known static libraries or identify some generated codes as well-known system libraries generated by Just In Time (JIT) compiler of Java/.NET/scripts (e.g., python) runtime.

In one aspect, the deep analysis tool further includes a feature for determining whether the application calls the kernel directly.

For an illustrative example on a Windows based system, the application may be calling the kernel directly via a small library function that invokes the system call, such as using a syscall instruction. It is noted that a problem occurs when malware use syscall/sysenter directly. There are different ways to deal with this problem. First, the behavior may be detected by comparing syscall counters: all syscall counter (kernel statistics) and syscalls from ntdll.dll (it demands custom ntdll.dll with call counters). If a difference between these values for the sample is detected, the malware uses syscalls directly. Second, in order to use syscall/sysenter directly, the sample should know the API mapping of syscall number with Native API functions that could be different with library version. To find out the mapping the sample could scan ntdll.dll that could be detected. Finally, disassembler may be used to find syscall/sysenter instructions.

In one aspect, the time machine module 372 keeps counting the time flow and disguises time flow anomalies caused by the deep analysis tool. For example, delays in processing are disguised to ensure that the performance degradation due to execution of codes of the tool.

In one aspect, the method detects malicious activity using a set of hooks. For example, the set of hooks may include hooks that inject malicious activity into clean processes. The set of hooks used for generating the events of Type B may be pre-determined by the user, e.g., based on applications or services running on the endpoint device.

In one aspect, the method detects malicious activity when a suspicious cryptographic activity or crypto-mining is identified.

In one aspect, the function body patch of the present disclosure includes a cloaking feature that returns original instructions for samples under analysis—thereby preventing a reading of a memory from showing modifications. The modified code is executed and the integrity check is passed.

In one aspect, the cloaking is performed either using a Translation Lookaside Buffer (TLB) cache split or using methods to control access rights to pages, e.g., using Intel Protection Key Rights Register (PKRU) mechanisms. When the TLB cache split is used, modified instructions are stored in instruction cache while reading gets original system code. When the Intel PKRU mechanism is used, access rights are applied to allow instruction fetching, and to disable reading such that reading attempts lead to page faults. The usage of these mechanisms may be disguised through virtualization. Alternatively, a disassembler may be used to prevent execution of unprivileged instructions, e.g., RDPKRU (read PKRU) or WRPKRU (write PKRU) instructions.

In one aspect, the time machine module intercepts all calls and accesses to time accounting, and emulates a time flow of processes associated with the calls and accesses as if there is no additional workload caused by the deep dynamic analysis tool. The emulation includes hiding performance degradations. In other words, the time machine module performs at least some of the operations for implementing the cloaking (i.e., the third technique of the dynamic analysis tool).

It is noted that the injected dynamically loaded component of the present disclosure is transparent to the memory map switch. In order to enable the transparency, the injected dynamically loaded component is made independent of the system libraries, including C Runtime libraries that call the system dynamically loaded component functions. The transparency is needed only for the on-sample execution part of the injected code, not for the pre-sample execution part. The pre-sample execution occurs when the application entry point is patched with continuous jump. During the pre-sample execution, memory control is not performed. Therefore, the pre-sample execution part is free to use the system libraries. In contrast, the on-sample execution occurs when the entry point is patched back to the original code and the sample code is executed.

In one aspect, in order to facilitate the pre-sample and on-sample executions, the injected dynamically loaded component is split into two parts where a first part is free to use the system libraries and a second part is independent of the system libraries. The first part copies the second part into the process address space, and the injected dynamically loaded component is unloaded. The second part calls the system code directly, for example, for Windows based systems, sysnter instructions may be used.

In one aspect, the deep analysis tool created two separate sections, one section for storing codes and the other section for storing data for the run-time part of the injected dynamically loaded component (e.g., .text2 and .data2). In one illustrative example based on the Windows system, the two sections are created using #pragma alloc directive. When the two separate sections are utilized, the sample under analysis does not find out about the injected dynamically loaded component, because it will not be on the loaded modules list. Another approach for hiding the injected dynamically loaded component is to hook an appropriate API. However, this approach works only when the process does not get the loaded modules list using PEB.

In operation, the injected dynamically loaded component performs an initialization and then makes a copy of the injected dynamically loaded component part that does not use anything besides pure system calls to the OS kernel (i.e., not even using Native API NtXxx wrappers) and unloads itself—thereby cleaning any evidence that the injected dynamically loaded component was ever loaded. The injected dynamically loaded component includes two parts. The first part is executed in an initialization phase when the process being examined has not been started or is suspended. The second part does not use anything besides pure system calls to the OS kernel and can be copied. The ability to copy the second part allows the injected dynamically loaded component to unload and hide any evidence that the injected component was ever loaded. The aspect of the injected dynamically loaded component that cleans the evidence of ever being loaded may be considered as a part of the third technique, i.e., as a part of the cloaking.

In one aspect, the deep analysis tool may be implements using the user-mode only, as described above, or also using some capabilities of the OS and/or microprocessor. When the analysis is implemented using the user-mode only, the method relied on OS services only. However, if OS and/or microprocessor capabilities are also to be used, the tool is additionally powered by kernel mode drivers or a custom hypervisor.

In some implementations, switch process performance issues may occur. For instance, for Windows OSs, ZwProtectVirtualMemory may be used to change access per 4 Kb or 2 Mb pages. One approach for mitigating the switch process performance issue is removing the per page disabling function. For example, gigabyte regions may be disabled using PDP, and 512 Gb regions may be disabled with PML4. These approach demands the application code and the system code to be in different 4 level regions. The memory structure may be supported by controlling ZwMapViewOfSection. It is important to note that conflicts with operation system codes needs to be avoided. There are no API to set XD bit in high level pages, so the XD bit needs to be set directly, potentially interfering with the memory manager.

Another approach for mitigating the switch process performance issue is using techniques based on hardware virtualization support. For example, guest paging may be used for analyzed process. The guest has an access to hardware, and the guest and real virtual addresses are same. But, X bit in Extended Page Table allows disabling instruction fetch. This approach also mitigates performance degradation for the multi-threaded case.

Yet another approach for mitigating the switch process performance is to use technologies intended to fight against ROP vulnerability. These technologies include shadow stack concepts and indirect branch tracking. This approach may be beneficial when application and system codes are separated in memory with a gap of more than 4 Gb and calls are indirect. The technologies intended to fight against ROP vulnerabilities provide jump detection without access bit manipulation.

Figure 12:
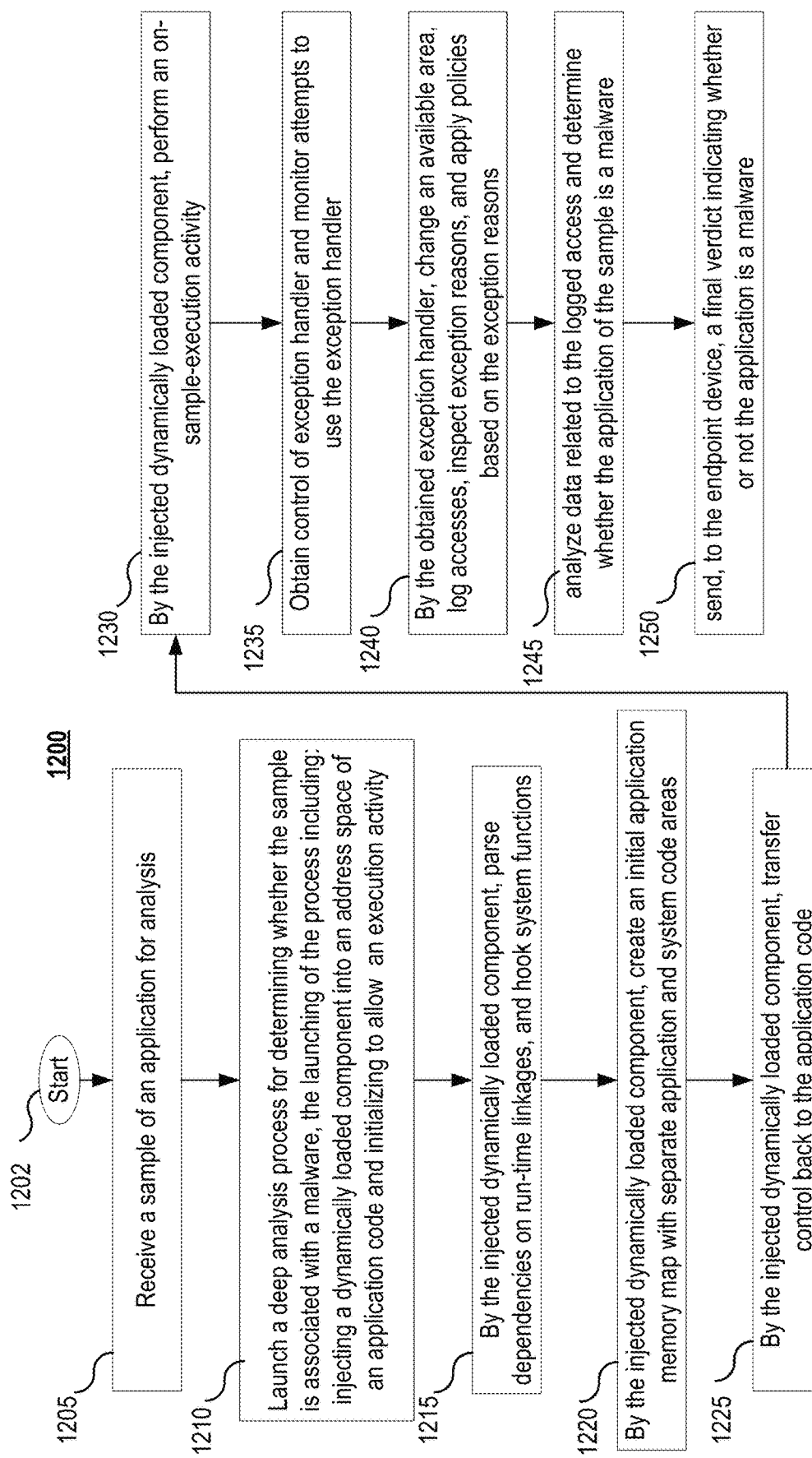
FIG. 12 illustrates a flow diagram of a method for identifying a malware in accordance with aspects of the present disclosure.

FIG. 12 illustrates a flow diagram of a method 1200 for identifying a malware in accordance with aspects of the present disclosure. Method 1200 may be implemented in a test server, e.g., a server of a safe isolated environment. Method 1200 starts in step 1202 and proceeds to step 1205.

In step 1205, method 1200 receives a sample of an application for analysis. For example, the sample may be received from an endpoint device.

In step 1210, method 1200 launches a deep analysis process for determining whether the sample is associated with a malware, the launching of the process including: injecting a dynamically loaded component into an address space of an application code and initializing, by the dynamically loaded component, to allow an execution activity. The initialization may be performed by loading the program as suspended, by using a non-OS (non-operating system) loader, by patching an entry-point of an application, etc.

In step 1215, by the injected dynamically loaded component method 1200 parses dependencies of run-time linkages and hooks system functions. For example, the parsing of dependencies for Windows OS may include: parsing the import address table (TAT), creating an application import map, such as importing or detecting well-known static libraries. The well-known static libraries may be detected by their signatures.

In step 1220, by the injected dynamically loaded component, method 1200 creates an initial application memory map with separate application and system code areas.

In step 1225, method 1200 patches the entry point back to the original code.

In step 1230, by the injected dynamically loaded component, method 1200 perform an on-sample-execution activity.

In step 1235, method 1200, obtains control of exception handler and monitors attempts to use the exception handler. For example, on Windows, the method registers, Vectored Exception Handler (VEH) and protects the control by monitoring all attempts to use the VEH.

In step 1240, by the registered exception handler, method 1200 changes the available area, logs accesses, inspects exception reasons, and applies policies based on the exception reasons.

In step 1245, method 1200, analyzes data related to the logged access to determine whether the application of the sample is a malware.

In step 1250, method 1200, sends a final verdict to the endpoint device indicating whether or not the application is a malware.

It is noted that aspects of the method of the present disclosure were described above by way of examples based on computing devices that use the Windows OS. However, the method of the disclosure may be applied for devices that use other Oss; the names of certain items may be different. For example, the DLL of the Windows OS, would be replaced by DyLib for Mac operating systems, and by Linux SO for Linux operating systems.

Figure 13:
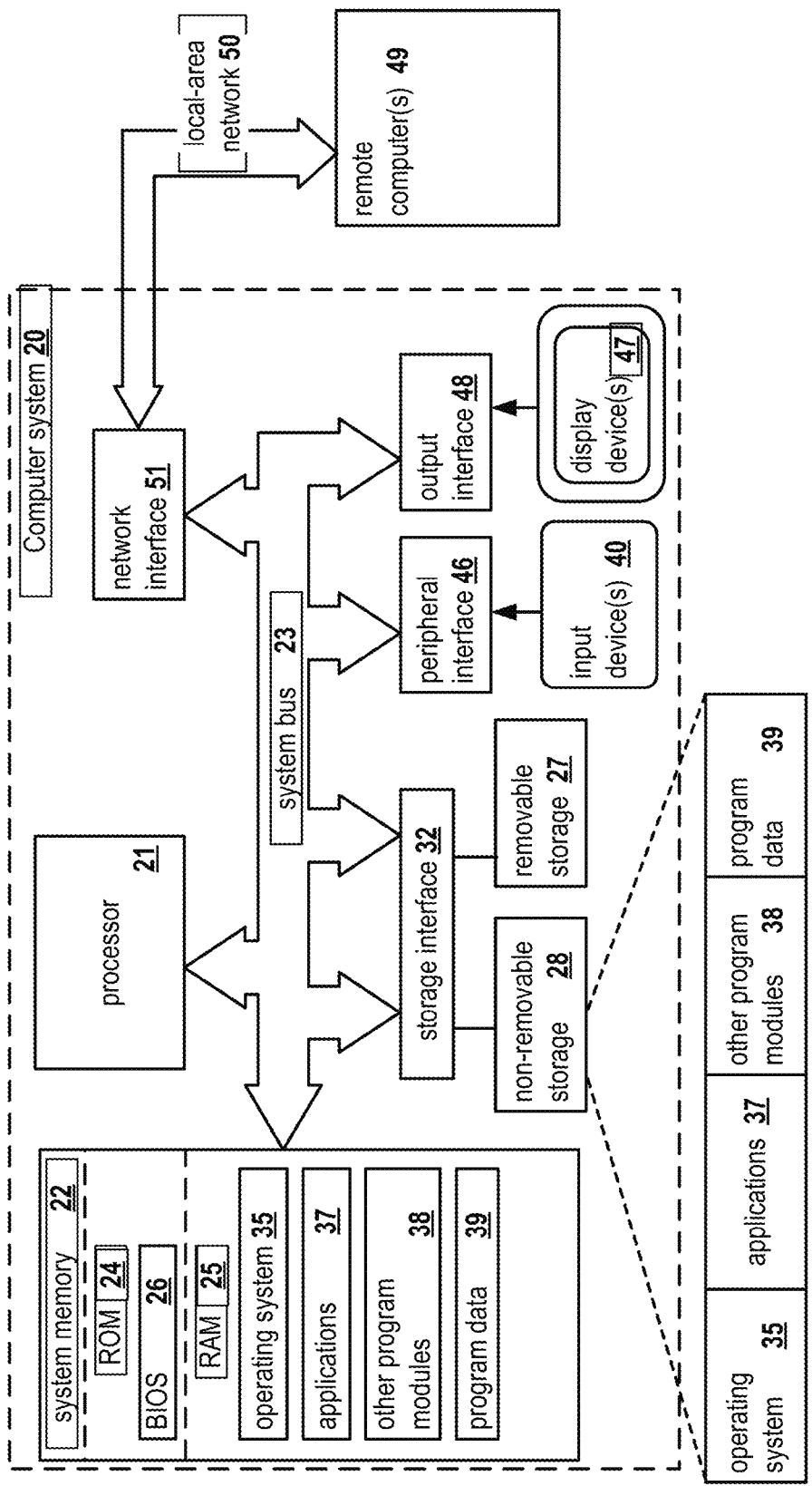
FIG. 13 presents an example of a general-purpose computer system on which aspects of the present disclosure can be implemented.

FIG. 13 is a block diagram illustrating a computer system 20 on which aspects of systems and methods for deep dynamic malware analysis for protecting endpoint devices from malware may be implemented in accordance with an exemplary aspect. It should be noted that the computer system 20 can correspond to the test server 150 with deep analysis tool 360, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 13, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for deep dynamic analysis for protecting endpoint devices from malware, comprising:
   launching a deep analysis process, by a deep analysis tool of a server in a safe isolated environment, for determining whether a received sample of an application is a malware, the launching of the process including: injecting a dynamically loaded component into an address space of an application code and initializing, by the dynamically loaded component, to allow an execution activity;
   by the injected dynamically loaded component, parsing dependencies of run-time linkages, hooking system functions, creating an initial application memory map with separate application and system code areas, patching an entry point back to the application code, and performing an on-sample-execution activity;
   unloading and hiding evidence of the injected dynamically loaded component by making a copy of a part of the injected dynamically loaded component that solely makes system calls to an operating system kernel of the server;
   obtaining control of exception handler and monitoring attempts to use the exception handler;
   by a registered exception handler, changing an available area, logging accesses, inspecting exception reasons, and applying policies based on the exception reasons;
   analyzing data related to the logged access and determining whether the application of the sample is a malware; and
   sending, to the endpoint device, a final verdict indicating whether or not the application is a malware.

2. The method of claim 1, wherein during the on-sample-execution activity, the deep analysis tool disables the system code.

3. The method of claim 1, wherein the application of the exception policies comprises: when the exception reason is an execution access, performing a memory access switch, when the exception reason is a write access, detecting the patch attempt and making a decision based on instruction disassembly, and when the exception reason is a read access, allowing a single reading.

4. The method of claim 1, wherein a part of the injected dynamically loaded component used for the on-sample execution is transparent to switching of the memory access.

5. The method of claim 1, wherein the initialization includes applying a cloaking feature that returns original instructions for samples under analysis.

6. The method of claim 1, wherein the deep analysis is performed while disguising time flow anomalies caused by the deep analysis tool.

7. A system for deep dynamic analysis for protecting endpoint devices from malware, comprising:
   at least one processor of a server of a safe isolated environment configured to:
   launch a deep analysis process, by a deep analysis tool of a server in a safe isolated environment, for determining whether a received sample of an application is a malware, the launching of the process including: injecting a dynamically loaded component into an address space of an application code and initializing, by the dynamically loaded component, to allow an execution activity;
   by the injected dynamically loaded component, parse dependencies of run-time linkages, hook system functions, create an initial application memory map with separate application and system code areas, patch an entry point back to the application code, and perform an on-sample-execution activity;
   unload and hide evidence of the injected dynamically loaded component by making a copy of a part of the injected dynamically loaded component that solely makes system calls to an operating system kernel of the server;
   obtain control of exception handler and monitors attempts to use the exception handler;
   by a registered exception handler, change an available area, log accesses, inspect exception reasons, and apply policies based on the exception reasons;
   analyze data related to the logged access and determine whether the application of the sample is a malware; and
   send, to the endpoint device, a final verdict indicating whether or not the application is a malware.

8. The system of claim 7, wherein during the on-sample-execution activity, the deep analysis tool disables the system code.

9. The system of claim 7, wherein the application of the exception policies comprises: when the exception reason is an execution access, performing a memory access switch, when the exception reason is a write access, detecting the patch attempt and making a decision based on instruction disassembly, and when the exception reason is a read access, allowing a single reading.

10. The system of claim 7, wherein a part of the injected dynamically loaded component used for the on-sample execution is transparent to switching of the memory access.

11. The system of claim 7, wherein the initialization includes applying a cloaking feature that returns original instructions for samples under analysis.

12. The system of claim 7, wherein the deep analysis is performed while disguising time flow anomalies caused by the deep analysis tool.

13. A non-transitory computer readable medium storing thereon computer executable instructions for deep dynamic analysis for protecting endpoint devices from malware, including instructions for:
   launching a deep analysis process, by a deep analysis tool of a server in a safe isolated environment, for determining whether a received sample of an application is a malware, the launching of the process including: injecting a dynamically loaded component into an address space of an application code and initializing, by the dynamically loaded component, to allow an execution activity;
   by the injected dynamically loaded component, parsing dependencies of run-time linkages, hooking system functions, creating an initial application memory map with separate application and system code areas, patching an entry point back to the application code, and performing an on-sample-execution activity;
   unloading and hiding evidence of the injected dynamically loaded component by making a copy of a part of the injected dynamically loaded component that solely makes system calls to an operating system kernel of the server;
   obtaining control of exception handler and monitoring attempts to use the exception handler;
   by a registered exception handler, changing an available area, logging accesses, inspecting exception reasons, and applying policies based on the exception reasons;
   analyzing data related to the logged access and determining whether the application of the sample is a malware; and sending, to the endpoint device, a final verdict indicating whether or not the application is a malware.

14. The non-transitory computer readable medium of claim 13, wherein during the on-sample-execution activity, the deep analysis tool disables the system code.

15. The non-transitory computer readable medium of claim 13, wherein the application of the exception policies comprises: when the exception reason is an execution access, performing a memory access switch, when the exception reason is a write access, detecting the patch attempt and making a decision based on instruction disassembly, and when the exception reason is a read access, allowing a single reading.

16. The non-transitory computer readable medium of claim 13, wherein a part of the injected dynamically loaded component used for the on-sample execution is transparent to switching of the memory access.

17. The non-transitory computer readable medium of claim 13, wherein the initialization includes applying a cloaking feature that returns original instructions for samples under analysis.

* * * * *